(12) United States Patent
Li et al.

(10) Patent No.: US 9,674,291 B2
(45) Date of Patent: *Jun. 6, 2017

(54) SUBSCRIPTION GROUPS IN PUBLISH-SUBSCRIBE SYSTEM

(71) Applicant: Facebook, Inc., Menlo Park, CA (US)

(72) Inventors: Harry C. Li, Palo Alto, CA (US); Philippe Vincent Ajoux, San Mateo, CA (US); Laurent Demailly, Belmont, CA (US); Liat Atsmon Guz, San Jose, CA (US); Yee Jiun Song, San Bruno, CA (US); Sabyasachi Roy, Fremont, CA (US); Sanjeev Kumar, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,316

(22) Filed: Apr. 7, 2016

(65) Prior Publication Data

US 2016/0226991 A1 Aug. 4, 2016

Related U.S. Application Data

(63) Continuation of application No. 14/620,085, filed on Feb. 11, 2015, now Pat. No. 9,344,395, which is a
(Continued)

(51) Int. Cl.
*H04W 4/08* (2009.01)
*H04L 29/08* (2006.01)
(Continued)

(52) U.S. Cl.
CPC ............. *H04L 67/26* (2013.01); *G06F 17/30* (2013.01); *H04L 51/00* (2013.01); *H04L 51/26* (2013.01);
(Continued)

(58) Field of Classification Search
CPC .... G05B 2219/31186; G05B 19/41875; H04L 45/00; H04L 45/54; H04L 47/805;
(Continued)

(56) References Cited

U.S. PATENT DOCUMENTS 6,158,007 A * 12/2000 Moreh ................ G06F 21/6227
726/1
6,173,310 B1 1/2001 Yost et al.
(Continued)

OTHER PUBLICATIONS

Non-Final Office Action mailed Mar. 18, 2016, for U.S. Appl. No. 14/846,409 of Song, Y.J. et al., filed Sep. 4, 2015.
(Continued)

*Primary Examiner* — Sargon Nano
(74) *Attorney, Agent, or Firm* — Perkins Coie LLP

(57) ABSTRACT

Disclosed is a technology for publishing subscriptions in a publish-subscribe system in accordance with subscription groups. The technology may include (i) determining a consumption characteristic by which each of multiple subscribers in a publish-subscribe system consumes a subscription published by a publisher; (ii) identifying the subscribers whose consumption characteristics satisfy a specified similarity criterion; (iii) defining multiple subscription groups, each of which includes subscriptions of those of the subscribers whose consumption characteristics satisfy the specified similarity criterion; (iv) storing the subscriptions in multiple logical partitions of a storage system where each of the logical partitions contains a separate non-overlapping subset of the subscriptions; and (v) transmitting the subscriptions to the subscribers in accordance with the subscription groups.

20 Claims, 15 Drawing Sheets

Related U.S. Application Data continuation of application No. 13/601,945, filed on Aug. 31, 2012, now Pat. No. 8,990,375.

(51) Int. Cl.
*H04L 12/58* (2006.01)
*G06F 17/30* (2006.01)
*H04L 29/06* (2006.01)

(52) U.S. Cl.
CPC ............ *H04L 51/32* (2013.01); *H04L 67/00* (2013.01); *H04L 67/22* (2013.01); *H04L 69/16* (2013.01); *H04L 67/306* (2013.01); *H04W 4/08* (2013.01)

(58) Field of Classification Search
CPC ....... H04L 47/20; H04L 65/80; H04L 67/327; H04L 45/306; H04L 45/308; H04L 47/24; H04L 47/2441; H04L 47/806; H04L 67/16; H04L 67/32; H04L 67/26; H04L 51/14; H04L 67/306
See application file for complete search history.

(56) References Cited

U.S. PATENT DOCUMENTS

| | | | |
|---|---|---|---|
| 6,571,140 B1 | 5/2003 | Wewalaarachchi et al. | |
| 6,877,107 B2 | 4/2005 | Giotta et al. | |
| 6,889,234 B1 | 5/2005 | Li et al. | |
| 6,944,183 B1 | 9/2005 | Iyer et al. | |
| 6,959,329 B2 | 10/2005 | Thakor | |
| 7,009,971 B2 | 3/2006 | Novaes | |
| 7,032,067 B2 | 4/2006 | Massard | |
| 7,089,363 B2 | 8/2006 | Ling et al. | |
| 7,331,049 B1 | 2/2008 | Jin et al. | |
| 7,418,475 B2 | 8/2008 | Stewart et al. | |
| 7,502,927 B2 | 3/2009 | Trostle et al. | |
| 7,698,276 B2* | 4/2010 | Seshadri | G06F 17/30867 719/318 |
| 7,720,910 B2 | 5/2010 | Goodman et al. | |
| 7,756,925 B2 | 7/2010 | Ginis et al. | |
| 7,831,693 B2 | 11/2010 | Lai | |
| 7,856,420 B2* | 12/2010 | Zargham | G06Q 10/06 707/627 |
| 7,889,738 B2 | 2/2011 | McAllister et al. | |
| 7,895,158 B2 | 2/2011 | Bosloy et al. | |
| 7,913,048 B2 | 3/2011 | Shen | |
| 7,961,667 B2 | 6/2011 | Perzy et al. | |
| 8,126,722 B2 | 2/2012 | Robb et al. | |
| 8,127,035 B1 | 2/2012 | Hood et al. | |
| 8,130,758 B2* | 3/2012 | Cohen | G06F 9/542 370/392 |
| 8,131,832 B1 | 3/2012 | Hood et al. | |
| 8,161,168 B2* | 4/2012 | Lankford | H04L 45/00 709/203 |
| 8,209,285 B2 | 6/2012 | Anand et al. | |
| 8,364,650 B2 | 1/2013 | Isnardy et al. | |
| 8,463,688 B2 | 6/2013 | Ritterman et al. | |
| 8,472,972 B2 | 6/2013 | Nadler et al. | |
| 8,533,742 B2 | 9/2013 | Ginis et al. | |
| 8,543,534 B2 | 9/2013 | Alves et al. | |
| 8,681,676 B2 | 3/2014 | Budampati et al. | |
| 8,745,185 B1* | 6/2014 | Salo | H04L 63/0428 709/223 |
| 8,775,667 B2* | 7/2014 | Reed | G06F 9/542 707/E17.008 |
| 8,787,226 B2 | 7/2014 | Yin et al. | |
| 8,832,700 B2 | 9/2014 | Amin et al. | |
| 8,929,391 B2 | 1/2015 | Smith et al. | |
| 8,990,375 B2 | 3/2015 | Li et al. | |
| 8,990,835 B2* | 3/2015 | Labejof | 719/315 |
| 9,189,510 B2 | 11/2015 | Song et al. | |
| 9,344,395 B2 | 5/2016 | Li et al. | |
| 9,477,598 B2 | 10/2016 | Song et al. | |
| 2003/0012194 A1 | 1/2003 | Novaes | |
| 2003/0065788 A1 | 4/2003 | Salomaki | |
| 2003/0120502 A1* | 6/2003 | Robb | G06Q 30/04 705/34 |
| 2004/0117574 A1 | 6/2004 | Massard | |
| 2004/0243256 A1* | 12/2004 | Willis | G05B 19/4183 700/21 |
| 2005/0021836 A1 | 1/2005 | Reed et al. | |
| 2005/0044197 A1 | 2/2005 | Lai | |
| 2005/0047645 A1* | 3/2005 | Funk | G05B 19/41865 382/145 |
| 2005/0055509 A1 | 3/2005 | Ling et al. | |
| 2005/0065630 A1* | 3/2005 | Funk | G05B 19/042 700/121 |
| 2005/0097317 A1 | 5/2005 | Trostle et al. | |
| 2005/0187649 A1* | 8/2005 | Funk | G05B 19/4184 700/121 |
| 2005/0251811 A1 | 11/2005 | Ginis et al. | |
| 2005/0262205 A1 | 11/2005 | Nikolov et al. | |
| 2006/0036679 A1 | 2/2006 | Goodman et al. | |
| 2006/0089131 A1* | 4/2006 | Huang | H04W 4/10 455/414.1 |
| 2006/0149788 A1 | 7/2006 | Bosloy et al. | |
| 2007/0140250 A1* | 6/2007 | McAllister | H04L 12/4645 370/392 |
| 2007/0150480 A1 | 6/2007 | Hwang et al. | |
| 2008/0019300 A1 | 1/2008 | Perzy et al. | |
| 2008/0040151 A1 | 2/2008 | Moore et al. | |
| 2008/0098446 A1 | 4/2008 | Seckin et al. | |
| 2008/0177880 A1 | 7/2008 | Ginis et al. | |
| 2008/0201451 A1 | 8/2008 | Yu et al. | |
| 2008/0243871 A1 | 10/2008 | Anand et al. | |
| 2009/0131080 A1 | 5/2009 | Nadler et al. | |
| 2009/0172123 A1 | 7/2009 | Ewing | |
| 2010/0217837 A1 | 8/2010 | Ansari et al. | |
| 2011/0019672 A1* | 1/2011 | Erramilli | H04L 12/1859 370/390 |
| 2011/0231781 A1 | 9/2011 | Betzler et al. | |
| 2012/0254063 A1 | 10/2012 | Ritterman et al. | |
| 2013/0018937 A1 | 1/2013 | Kim et al. | |
| 2013/0024874 A1* | 1/2013 | Labejof | G06F 8/67 719/315 |
| 2013/0058223 A1 | 3/2013 | Yin et al. | |
| 2013/0166729 A1 | 6/2013 | Gole et al. | |
| 2013/0346580 A1* | 12/2013 | Kim | H04L 67/306 709/223 |
| 2014/0067940 A1 | 3/2014 | Li et al. | |
| 2014/0101390 A1 | 4/2014 | Sohi et al. | |
| 2014/0244584 A1 | 8/2014 | Song et al. | |
| 2014/0289391 A1* | 9/2014 | Balaji | H04L 43/04 709/224 |
| 2014/0310293 A1 | 10/2014 | Knoll et al. | |
| 2015/0156158 A1 | 6/2015 | Li et al. | |
| 2015/0378894 A1 | 12/2015 | Song et al. | |
| 2016/0205210 A1* | 7/2016 | Ge | G06F 9/00 709/217 |

OTHER PUBLICATIONS

Notice of Allowance mailed Aug. 30, 2016, for U.S. Appl. No. 14/846,409 by Song, Y.J., et al., filed Sep. 4, 2015.
Corrected Notice of Allowability mailed Feb. 17, 2016, for U.S. Appl. No. 14/620,085 by Li, H., et al., filed Feb. 11, 2015.
Blaze et al., "Dynamic Hierarchical Caching in Large-Scale Distributed File Systems," Oct. 1991, pp. 1-10.
Cao, P., et al., "Maintaining Strong Cache Consistency in the World-Wide Web," 2010, pp. 1-17.
Corrected Notice of Allowability mailed Aug. 19, 2015, for U.S. Appl. No. 13/777,814 by Song, Y.J., et al., filed Feb. 26, 2013.
Final Office Action Mailed Oct. 14, 2014 in Co-Pending U.S. Appl. No. 13/601,945 of Li, H., et al., filed Aug. 31, 2012.
Franklin et al., "Transactional Client-Server Cache Consistency: Alternatives and Performance." University of Maryland College Park, Sep. 1995, pp. 1-39.
Gladney, "Data Replicas in Distributed Information Services," ACM Transactions on Database Systems, vol. 14, No. 1, Mar. 1989, pp. 75-97.

(56) References Cited

OTHER PUBLICATIONS

Hayashi et al., "Cache Invalidation for Updated Data in Ad Hoc Networks," On the Move to Meaningful Internet Systems, 2003: CoopIS, DOA, and ODBASE, LNCS vol. 28788, pp. 516-535, Springer Berling Heidelburg, 2003.
Non-Final Office Action Mailed Jul. 21, 2014 in Co-Pending U.S. Appl. No. 13/601,945 of Li, H., et al., filed Aug. 31, 2012.
Non-Final Office Action mailed Jul. 24, 2015, for U.S. Appl. No. 14/620,085 by Li, H., et al., filed Feb. 11, 2015.
Non-Final Office Action mailed Mar. 24, 2015, for U.S. Appl. No. 13/777,814 by Song, Y.J., et al., filed Feb. 26, 2013.
Non-Final Office Action mailed Oct. 31, 2014, forU.S. Appl. No. 13/777,814 by Song, Y.J., et al., filed Feb. 26, 2013.
Notice of Allowance mailed Jan. 13, 2016, for U.S. Appl. No. 14/620,085 by Li, H., et al., filed Feb. 11, 2015.
Notice of Allowance Mailed Jan. 14, 2015 in Co-Pending U.S. Appl. No. 13/601,945 of Li, H., et al., filed Aug. 31, 2012.
Notice of Allowance mailed Jul. 17, 2015, for U.S. Appl. No. 13/777,814 by Song, Y.J., et al., filed Feb. 26, 2013.
Ramesh et al., "Regional Consistency: Programmability and Performance for Non-Cache-Coherent Systems," Center for High End Computing Systems, Dept. of Computer Science, Virginia Tech, Blacksburg, Virginia, Jan. 18, 2013, pp. 1-8.
U.S. Appl. No. 13/601,945 by Li, H., et al., filed Aug. 31, 2012.
U.S. Appl. No. 13/777,814 by Song, Y.J., et al., filed Feb. 26, 2013.
U.S. Appl. No. 14/620,085 by Li, H., et al., filed Feb. 11, 2015.
U.S. Appl. No. 14/846,409 of Song, Y.J. et al., filed Sep. 4, 2015.
Yu et al., "A Scalable Web Cache Consistency Architecture," 1999, pp. 1-12.
Corrected Notice of Allowability mailed Sep. 19, 2016, for U.S. Appl. No. 14/846,409 by Song, Y.J., et al., filed Sep. 4, 2015.

\* cited by examiner

SUBSCRIPTION GROUPS IN PUBLISH-SUBSCRIBE SYSTEM

CROSS-REFERENCE TO RELATED APPLICATIONS

This application is a continuation application of U.S. patent application Ser. No. 14/620,085, filed on Feb. 11, 2015, entitled "SUBSCRIPTION GROUPS IN PUBLISH-SUBSCRIBE SYSTEM", which is a continuation of U.S. patent application Ser. No. 13/601,945, filed on Aug. 31, 2012, entitled "SUBSCRIPTION GROUPS IN PUBLISH-SUBSCRIBE SYSTEM", both of which are incorporated herein by reference in its entirety.

FIELD OF INVENTION

This invention generally relates to a publish-subscribe system. More specifically, the invention relates to various techniques in publishing subscriptions to subscribers.

BACKGROUND

In computer-related technologies, a publish-subscribe model is typically a messaging model where computer-implemented senders of messages, called publishers, publish messages to be consumed by interested computer-implemented receivers, called subscribers. A publisher is an entity that publishes messages. A subscriber is an entity that subscribes to or consumes the subscriptions published by the publisher. A producer is an entity that produces information that is published by the publisher. A publisher may publish messages regardless of a number of subscribers, interests of subscribers etc.

The publishers typically publish messages as a stream of updates and the subscribers consume the messages to which they are subscribed to from the stream of updates. Typically different subscribers have different consumption rates. That is, each of the subscribers in the publish-subscribe system may consume messages at different rates. For example, a first subscriber may consume X number of messages per second and a second subscriber may consume Y messages per second. If a publisher is publishing a total of Z number of messages per second, then the first subscriber may be lagging behind by (Z-X) number of messages and the second subscriber by (Z-Y) number of messages. The publisher may have to refetch the messages that are not consumed by the subscribers from a storage system and publish them again. This may lead to the publisher making excessive calls to the storage system, which consumes a significant amount of time and thus, may introduce further delays in the system.

Further, in certain publish-subscribe systems, if the subscriber fails temporarily and recovers after a brief period or simply does not receive a message, the publisher may not know a point from which the messages may have to be republished to the subscriber.

Additionally, certain publish-subscribe systems may be so tightly coupled that scalability is an issue and routing messages to subscribers at different locations may not be efficient. In current publish-subscribe systems, publishers that publish more than a set of subscriptions to the same subscriber may do so by establishing as many connections with the subscriber as the number of sets of subscriptions. However, establishing too many connections can consume a significant amount of computing, storage, and network resources.

In at least some publish-subscribe systems, a producer who generates information to be published as subscriptions and the publishers may be tightly coupled applications. That is, the producer may be designed to work with a specific publish-subscribe system. Such publish-subscribe systems may not be compatible with producers that may not be designed for a specific publish-subscribe system. This may limit the types of producers whose messages may be published using the publish-subscribe systems and also the types of messages that may be published.

SUMMARY

What is described below is a method and system for publishing subscriptions in a publish-subscribe system in accordance with subscription groups. Subscribers in the publish-subscribe system may have varied consumption characteristics (such as varied consumption rates). Subscribers having consumption characteristics that satisfy a specified similarity criterion (such as consumption rates falling within predetermined ranges) are grouped together and a subscription group is created for each of the groups of subscribers. The subscription group contains subscriptions of those subscribers whose consumption characteristics are similar. The subscriptions are then transmitted to the subscribers in accordance with the subscription groups. Further, as a subscriber's consumption characteristic changes, the corresponding subscription may be moved from one subscription group to another.

Embodiments of the invention may include: (i) determining, by a publish-subscribe system, a consumption characteristic by which each of a plurality of subscribers consumes a subscription published by a publisher; (ii) identifying, by the publish-subscribe system, the subscribers whose consumption characteristics satisfy a similarity criterion; (iii) defining, by the publish-subscribe system, a plurality of subscription groups, each of which includes subscriptions of those of the subscribers whose consumption characteristics satisfy a similarity criterion; and (iv) transmitting, by the publish-subscribe system, the subscriptions to the subscribers in accordance with the subscription groups.

In at least some embodiments of the invention, the consumption characteristic includes a consumption rate of the subscriber, which is the rate at which the subscriber consumes the subscription, and the specified similarity criterion includes consumption rates of subscribers that fall within predetermined ranges.

In at least some embodiments of the invention, one of the subscription groups is a lead subscription group which includes subscriptions of those subscribers whose consumption rates fall within a highest predetermined range among the predetermined ranges.

In at least some embodiments of the invention, transmitting the subscriptions includes transmitting the subscription groups as a stream, the stream having the subscription groups arranged in a decreasing order of the predetermined ranges of the consumption rates of the subscribers to which the subscriptions in each of the subscription groups correspond.

In at least some embodiments of the invention, the consumption characteristic includes characteristics other than, or in addition to, consumption rates. For example, a subscription group can be created based on certain users' commonly consuming certain classes of information, such as "highly engaged stories" in a social networking environment. A "highly engaged story" is defined as a story, article, topic or other set of user-readable information that has some characteristic that shows at least a specified minimum degree of user engagement, such as the presence of user comments, "likes" (i.e., indications of user approval), or user sharing of the information (or a certain minimum number of occurrences of such features).

At least some embodiments of the invention may include: (i) transmitting, by a publisher in publish-subscribe system, subscriptions to subscribers in accordance with a plurality of subscription groups, each of the subscription groups including subscriptions of subscribers whose consumption rates fall within a particular predetermined range of a plurality of predetermined ranges, the consumption rates including rates at which the subscriptions are consumed by each of the subscribers; (ii) determining if a consumption rate of one of the subscribers has changed; (iii) responsive to a determination that the consumption rate of one of the subscribers satisfies a predetermined change criteria, (a) identifying a subscription group among the subscription groups which includes subscriptions of the subscribers whose consumption rates are similar to the consumption rate of the one of the subscribers, and (b) moving a subscription of the one of the subscribers to the identified subscription group to create an updated subscription group; and (iv) transmitting, by the publisher, the subscriptions to the subscribers in accordance with the subscription groups, the subscription groups including the updated subscription group.

Some embodiments of the invention have other aspects, elements, features, and steps in addition to or in place of what is described above. These potential additions and replacements are described throughout the rest of the specification.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed is a method and system for publishing subscriptions in a publish-subscribe system in accordance with subscription groups. The method may include: (i) determining, by a publish-subscribe system, a consumption characteristic by which each of a plurality of subscribers consumes a subscription published by a publisher; (ii) identifying, by the publish-subscribe system, the subscribers whose consumption characteristics satisfy a similarity criterion; (iii) defining, by the publish-subscribe system, a plurality of subscription groups, each of which includes subscriptions of those of the subscribers whose consumption characteristics satisfy a similarity criterion; and (iv) transmitting, by the publish-subscribe system, the subscriptions to the subscribers in accordance with the subscription groups.

Environment

Figure 1:
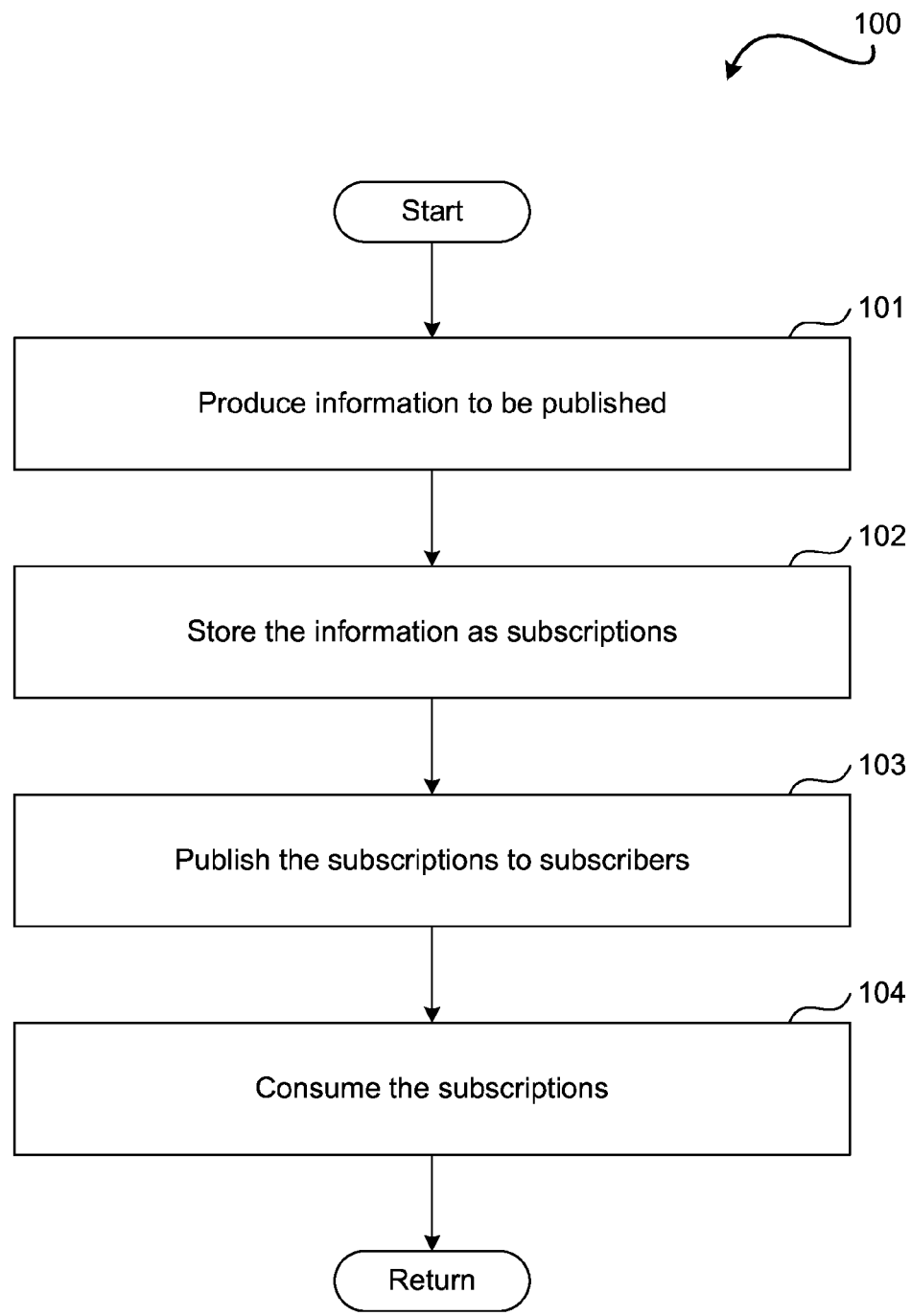
FIG. 1 illustrates a flow diagram illustrating a method for publishing subscriptions in a publish-subscribe system.

FIG. 1 illustrates a flow diagram 100 for publishing subscriptions in a publish-subscribe (hereinafter P/S) system, according to an embodiment of the invention. At step 101, a producer generates information. At step 102, the information generated by the producer is stored in a storage system such as, for example, a database in the P/S system. A subscriber can subscribe to all or a set of subscriptions published by the publisher. The subscriber can subscribe to a particular subscription by sending a subscription request to the publisher for the particular subscription. At step 103, the subscriptions are published to the subscribers by the publisher. At step 104, the subscriptions are consumed by the subscribers.

Figure 2:
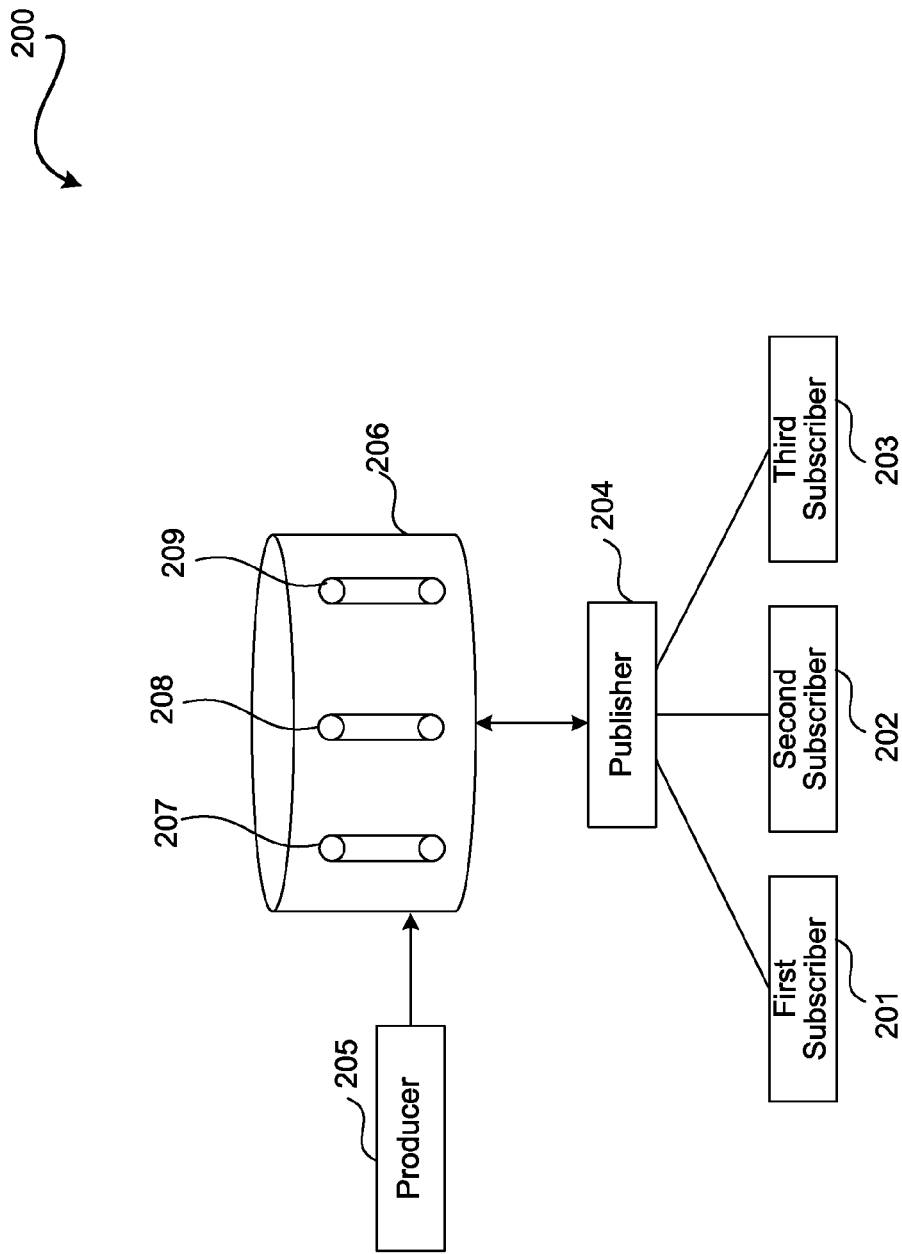
FIG. 2 illustrates an environment in which an embodiment of the invention may operate.

FIG. 2 illustrates an environment 200 in which an embodiment of the invention may operate. As shown, the environment 200 includes a publish-subscribe system 200. The P/S system 200 includes a producer 205 that produces information to be published, a storage system such as, for example, database 206 to store the information to be published, a publisher 204 to publish the information stored in the database 206, and subscribers, namely, a first subscriber 201, a second subscriber 202, and a third subscriber 203, to consume the information published by the publisher 204. The P/S system 200 includes a plurality of producers, a plurality of publishers, a plurality of databases and one or more subscribers. Various entities, including each producer, publisher, or subscriber, may run on one or more computers in a computer system and may communicate with each other over a computer network. The publisher 204 and/or the producer 205 can be integrated into the database 206. Each of the components in the P/S system 200 can run on one more computers and may communicate with each other over a communication network, for example, Local Area Network (LAN), Wide Area Network (WAN), and Internet.

The database 206 may be partitioned into a number of logical partitions, also called "shards." Sharding is a type of partitioning where a configurable number of rows of a database table may be stored in a shard. For example, in a social networking environment having Z number of users, a given shard may include data for X out of Z number of users. In the P/S system 200, the database 200 may include the shards, for example, a first shard 207, a second shard 208, and a third shard 209. Each of the shards may include a separate non-overlapping subset of data contained in the database 206. For example, in a database that has data pertaining to Z users, a first shard 207, a second shard 208, and a third shard 209 may have data pertaining to A, B, C users respectively, where $A \subset Z$, $B \subset Z$, $C \subset Z$ and $\{A \cap B\} = \emptyset$, $\{B \cap C\} = \emptyset$, and $\{C \cap A\} = \emptyset$, and where the symbol $\subset$ denotes a subset of, $\cap$ intersection and $\emptyset$ denotes a null set. Each of the shards can be held on a different machine or on the same machine. When a producer 205 generates information, the generated information is stored in one of the shards of the database 206. The publisher 204 may fetch the information from the shards and publish them as subscriptions to the subscribers.

The subscriptions published by the publisher 204 include any new information added to the database 206, modifications of and/or deletions of existing information in the database 206 since some particular time or event. That is, the publisher 204 publishes any updates to the database 206 and the subscriber may subscribe to subscriptions from the database 206 in which the subscriber is interested. The subscribers may also request the publisher 204 to publish updates that occurred since a particular point in time. The producer 205 may be, for example, any application that causes new information to be added or existing information to be deleted or modified in the database 206. For example, in a social networking environment, the producer 205 may include a user profile generating application that generates birthday information of a user when the user adds, deletes or changes a date of birth of the user. A subscriber may include, but is not limited to, an end user, another application, or service. For example, an age calculator application may be a subscriber of date of birth information of a user.

The producer 205 may include a number of applications. The producer 205 generates new information and stores the new information in their proprietary storage unit, such as a log file in the producer 205 application. The P/S system 200 may be designed in such a way that the P/S system 200 is capable of reading information from a portable log file of a number of producer applications. The P/S system 200 may be capable of extracting new information from the portable log files of the producer applications and store them as subscriptions in the database 206. The producer 205 may include an application that may generate information in the application's own database, such as for example, a MySQL database. The P/S system 200 can extract information generated by the producer 205 from a log file of the MySQL database in the application. The extracted information may be stored in the database 206 and later published to the subscribers. The P/S system may publish the information extracted from the log file to the subscriber without storing the extracted information in the database 206.

The publisher may publish subscriptions as a continuous stream of updates. The subscribers consume their respective subscriptions from the stream. Each of the subscribers may have a different consumption rate, which is the rate at which they consume the subscriptions. The consumption rate may include, but is not limited to, a consumption of number of subscriptions per second, or a consumption of number of bits per second by a subscriber. For example, the first subscriber 201 may consume 200 updates per second and the second subscriber 202 may consume 60 updates per second. If the publisher is publishing at 500 updates per second, the first subscriber 201 may only consume 200 of the 500 latest updates and the second subscriber 202 may consume only 60 of the 500 updates. Therefore, the first subscriber 201 would be lagging behind by 400 updates and the second subscriber 202 by 440 updates. Therefore, because of varied consumption rates of each of the set of subscribers, each subscriber may be consuming the updates at a different position in the update stream. This may cause back pressure to the publisher 204, since the updates from the stream are not being consumed completely. In order to avoid such back pressure, the publisher 204 may have to fetch the updates that were not consumed by the set of subscriber from the database again and republish them to the slower subscribers. That is, the publisher 204 may have to connect to the database 206 multiple times to publish the updates to the set of subscribers. However, making multiple connections to the database 206 increases the load on the database, which may further cause a delay in serving the requests. Further, this problem may be more severe as the number of subscribers increases.

In an embodiment, at least to minimize the load on the database 206 and to eliminate the back pressure on the publisher 204, the P/S system 200 may have to reduce the number of connections to the database 206 by fetching the subscriptions less often. The P/S system 200 can achieve this by grouping the subscriptions into a plurality of subscription groups and publishing them as a stream of subscription groups. The subscription groups are formed in accordance with consumption rates of the subscribers in the P/S system. The subscriptions are fetched from the database 206 in accordance with the subscription groups. The publishing of subscriptions as a stream of subscription groups is described in relation to FIGS. 3-5 in the following paragraphs.

Methods for Transmitting Subscriptions as a Stream of Subscription Groups

Figure 3:
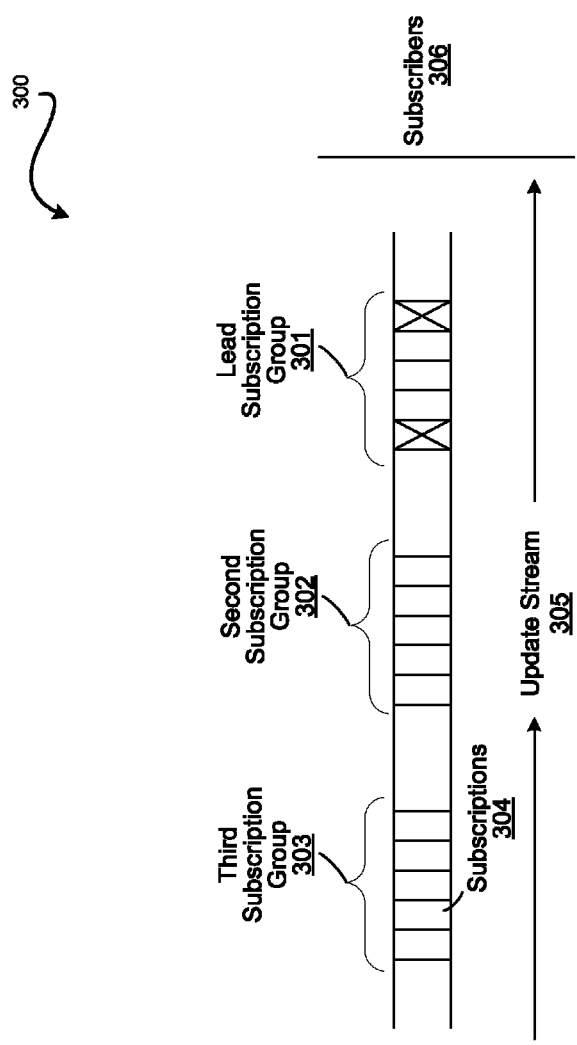
FIG. 3 is a block diagram illustrating subscription groups in an update stream transmitted to a subscriber.

FIG. 3 is a block diagram 300 illustrating subscription groups in an update stream transmitted to a subscriber, according to an embodiment of the invention. The update stream 305 may be a stream of subscriptions transmitted by a publisher such as the publisher 204 of FIG. 2 to subscribers 306 such as, for example, the first subscriber 201, the second subscriber 202 and the third subscriber 203 of FIG. 2. The update stream 305 includes subscription groups such as a lead subscription group 301, a second subscription group 302 and a third subscription group 303. Each of the three subscription groups includes subscriptions, such as subscriptions 304, of a set of subscribers whose consumption rates fall within a particular predetermined range.

Consider a P/S system which has a number of subscribers who have consumption rates ranging from 200 updates per second to 800 updates per second. The P/S system may identify subscribers who have consumption rates falling within predetermined ranges. In an embodiment, the number of predetermined ranges may be determined in a number of ways, including, but not limited to, a predetermined number, a random function, based on number of subscribers, based on a difference between consumption rates of each of the subscribers, or based on number of subscriptions. For example, in the above scenario, the P/S system may have three different predetermined ranges of the consumption rates, namely, a first predetermined range of 501-800 updates per second, a second predetermined range of 301-500 updates per second and a third predetermined range of 200-300 updates per second.

The P/S system can create a plurality of subscription groups, one for each predetermined range. For example, the P/S system can create a lead subscription group 301 which includes subscriptions of those subscribers whose consumption rates may fall in the first predetermined range of 501-800 updates per second, a second subscription group 302 which includes subscriptions of those subscribers whose consumption rates fall in the second predetermined range of 301-500 updates per second, a third subscription group 303 which includes subscriptions of those subscribers whose consumption rates fall in the third predetermined range of 200-300 updates per second.

The lead subscription group 301 always includes subscriptions of those subscribers whose consumption rates fall in the highest predetermined range among the determined predetermined ranges. The subscription groups are arranged in a decreasing order of the predetermined ranges of the consumption rates of the subscribers. For example, in the update stream 305, the lead subscription group 301 which includes subscriptions of those subscribers with the highest consumption rates is positioned first, the second subscription group 302 which includes subscriptions of those subscribers with the consumption rates lesser than the consumption rates of the subscribers corresponding to the subscriptions in the lead subscription group 301 is positioned behind the lead subscription 301 and similarly the third subscription group 303 is placed behind the second subscription group 302. The subscription groups are published according to their order in the update stream 305. By publishing the subscriptions according to the consumption rates of the subscribers, the back pressure on the publisher, created by slower subscribers, may be minimized.

When the consumption rate of a subscriber changes, a subscription of the subscriber may be moved to a corresponding subscription group. For example, if a consumption rate of a subscriber whose subscription is in the second subscription group 302 increases such that the consumption rate of the subscriber falls in the predetermined range of the consumption rates of those subscribers having their subscriptions in the lead subscription group 301, a subscription of the subscriber is moved, from the second subscription group 302, ahead to the lead subscription group 301. Similarly, if the consumption rate of the subscriber decreases such that the consumption rate of the subscriber falls in the predetermined range of the consumption rates of those subscribers having their subscriptions in the third subscription group 303, a subscription of the subscriber is moved back, from the second subscription group 302, to the third subscription group 303. Further, the lead subscription group always includes the latest subscriptions from the publisher. If a subscriber is not in a position to consume the latest subscription transmitted by the publisher, the subscription is moved back to a subscription group trailing the lead subscription group.

Figure 4:
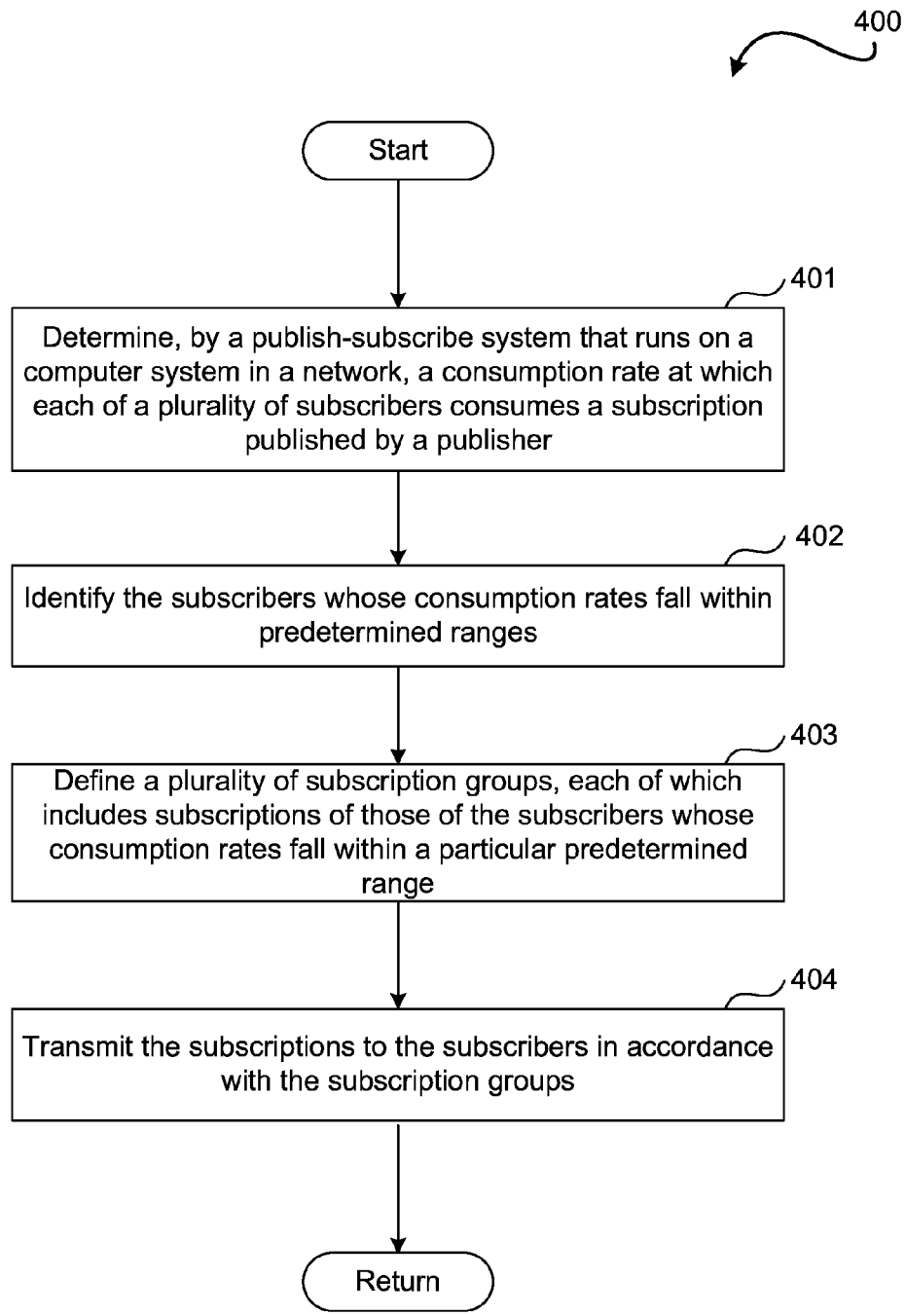
FIG. 4 is a flow diagram illustrating a method for transmitting subscriptions in accordance with a plurality of subscription groups.

FIG. 4 is a flow diagram for transmitting subscriptions from a server to a client in a P/S system in accordance with a plurality of subscription groups, according to an embodiment of the invention. The method 400 may be used in a P/S system such as, for example, P/S system 200 of FIG. 2. In another embodiment, the method 400 may also be used in other similar publish-subscribe systems. At step 401, the publisher determines a consumption rate of each of a plurality of subscribers in the P/S system. The consumption rate of a subscriber may be a rate at which the subscriber consumes the subscriptions published by a publisher. At step 402, the publisher identifies subscribers whose consumption rates fall within predetermined ranges. The predetermined ranges may be based on absolute values or values relative to consumption rates of the subscribers in the P/S system. For example, if the consumption rates of a slowest subscriber and a fastest subscribers are 200 updates per second and 1000 updates per second, respectively, the predetermined ranges, calculated based on relative consumption rates, may include predetermined ranges between f(200) and f(1000), where f is some specified function. If the predetermined ranges are calculated based on absolute values, a lower limit and an upper limit of the predetermined ranges may be a user-configurable value.

At step 403, the publisher defines a plurality of subscription groups, each of which includes subscriptions of those of the subscribers whose consumption rates fall within a particular predetermined range. A subscription group which includes the subscriptions of those of the subscribers whose consumption rates fall in the highest predetermined range, is called as a lead subscription group. The lead subscription group includes the latest subscriptions published by the publisher and the remaining of the subscription groups contains subscriptions older than the subscriptions in the lead subscription group. At step 404, the publisher transmits the subscriptions to the subscribers in accordance with the subscription groups. The subscriptions may be transmitted to the subscribers as a stream of subscription groups.

In other embodiments, subscription groups may be created based on consumption characteristics other than, or in addition to, consumption rates. For example, a subscription group (or multiple subscription groups) can be created based on certain users' commonly consuming certain classes of information, such as "highly engaged stories" in a social networking environment. A "highly engaged story" is defined as a story, article, topic or other set of user-understandable information that has some characteristic that shows at least a specified minimum degree of user engagement, such as the presence of user comments, "likes" (i.e., indications of user approval), or user sharing of the information (or a certain minimum number of occurrences of such features). Such information can include multimedia content such as text, audio, picture, video, animation, or a combination thereof. Therefore, in some embodiments a subscription group can be created for all users who subscribe to a particular highly engaged story. It is envision that other criteria could also be used to define subscription groups.

Figure 5A:
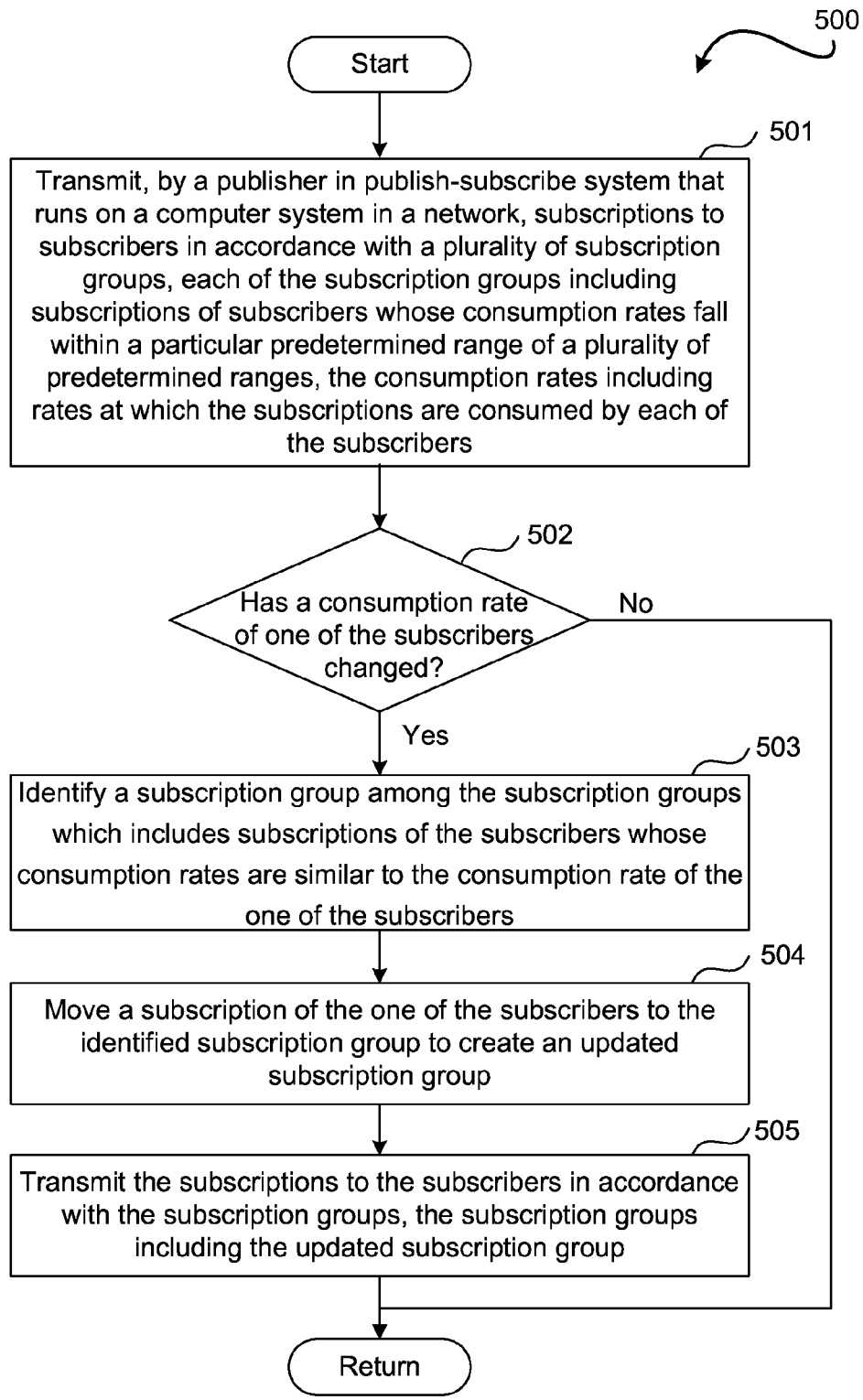
FIGS. 5A and 5B collectively are a flow diagram for moving a subscription between subscription groups.
Figure 5B:
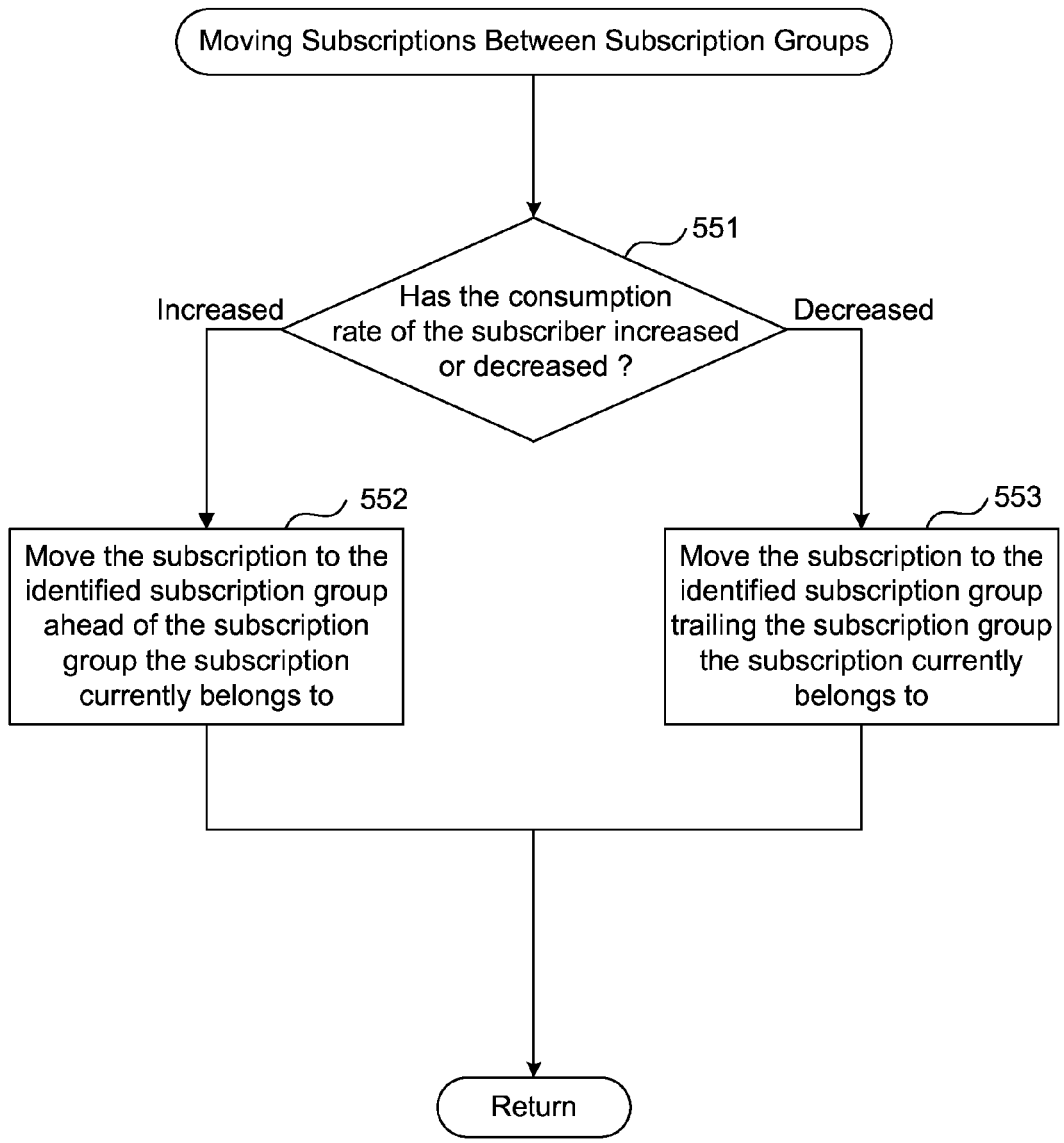

FIGS. 5A and 5B collectively are flow diagrams for moving a subscription between subscription groups, according to an embodiment of the invention. The method 500 may be used in a P/S system such as, for example, P/S system 200 of FIG. 2. The method 500 may be used in other similar P/S systems. At step 501, the publisher transmits the subscriptions to subscribers in accordance with subscription groups, for example, created using the method 400 of FIG. 4. At decision step 502, the publisher determines whether a consumption rate of a subscriber has changed. Responsive to a determination that the consumption rate of a subscriber has not changed, the method 400 returns. On the other hand, responsive to a determination that the consumption rate of a subscriber has changed, at step 503, the publisher identifies a subscription group among the subscription groups which includes subscriptions of the subscribers whose consumption rates are similar to or correspond to a predetermined range of the consumption rate of the subscriber.

At step 504, the publisher moves the subscription to the identified subscription group. The identified subscription group is updated with moved subscription. At step 505, the publisher transmits the subscriptions to the subscribers in accordance with the subscription groups, the subscription groups including the updated subscription group.

Referring back to step 504, the subscription may be moved to a subscription group ahead or behind a current subscription group the subscription belongs to, based on whether the consumption rate of the subscriber has increased or decreased. FIG. 5B illustrates moving the subscription to a subscription group ahead or behind the current subscription group, according to an embodiment of the invention. At step 551, it is determined, by the P/S system, whether a consumption rate of the subscriber has increased or decreased. Responsive to a determination that the consumption rate of the subscriber has increased, at step 552, the subscription is moved, by the P/S system, to the identified subscription group ahead of the current subscription group the subscription belongs to. Responsive to a determination that the consumption rate of the subscriber has decreased, at step 553, the subscription is moved, by the P/S system, to the identified subscription group behind the current subscription group the subscription belongs to.

Further, a subscription group may be split into one or more new subscription groups based on criteria for splitting. The criteria for splitting may include, but is not limited to, changed consumption rates of subscribers and number of subscriptions in the subscription group. Consumption rates of a few subscribers having subscriptions in a particular subscription group may change. If there are no existing subscription groups that have subscriptions of subscribers having consumption rates similar to or in a predetermined range of the consumption rates of the few subscribers, the particular subscription group may be split into a plurality of new subscription groups. The new subscription groups may have new predetermined ranges of consumption rates. For example, referring to FIG. 3, the third subscription group 303 may be split into a plurality of new subscription groups having different predetermined ranges.

Similarly, a plurality of subscription groups may be merged into one subscription group, based on criteria for splitting. The criteria for merging the subscription groups may include, but is not limited to, changed consumption rates of subscribers and number of subscriptions in each of the subscription groups. Consumption rates of subscribers corresponding to the subscriptions across the subscription groups may change such that, for example, the consumption rates are within a predetermined range of the consumption rates of subscribers corresponding to subscriptions in another subscription group. For example, referring to FIG. 3, second subscription group 302 and third subscription group 303 may be merged into a new subscription group. In another embodiment, consumption rates of subscribers may change such that, for example, the consumption rates of all subscribers corresponding to the subscriptions across all the subscription groups may be within a new predetermined range. In such cases, the subscription groups may be merged into a new subscription group. The subscribers corresponding to the subscriptions in the new subscription group may have consumption rates that fall in a new predetermined range or one of existing predetermined ranges.

Referring back to step 552, a subscription from a subscription group may not be moved ahead of the lead subscription group even if a consumption rate of a subscriber associated with the subscription increases beyond a predetermined range of consumption rates of subscribers associated with subscriptions in the lead subscription group. A lead subscription group is always positioned first in a stream of subscription groups transmitted to the subscribers.

Figure 6:
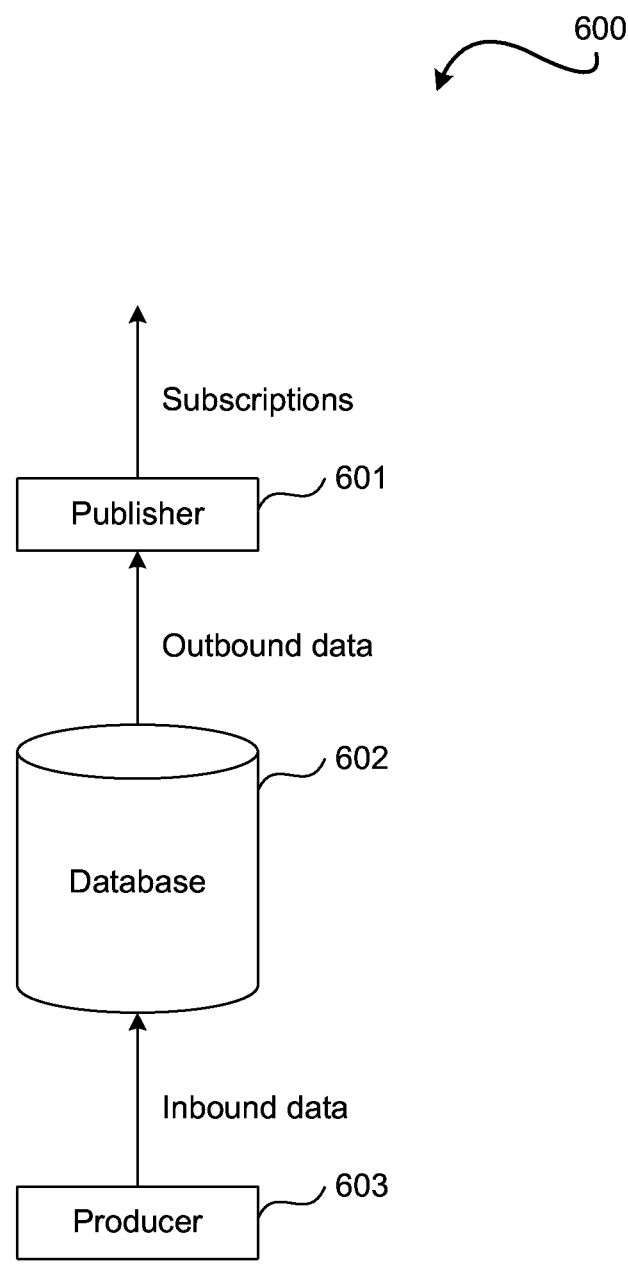
FIG. 6 is a block diagram illustrating updating a storage system with new information generated by a producer in the publish-subscribe system.

FIG. 6 is a block diagram illustrating updating a storage system with new information generated by a producer in a publish-subscribe system, according to an embodiment of the invention. The P/S system 600 may be similar to the P/S system 200 of FIG. 2. A producer 603 may generate new information which may be stored in a storage system such as, for example, database 602 and a publisher 601 may publish this new information as subscriptions to subscribers. Inbound data to the database 602 may include the new information from the producer 603 and the outbound data may include the subscriptions published to the subscribers. Typically, a P/S system may have to ensure that subscribers get the latest information with minimum or no delay. To ensure that subscribers get the latest information with minimum or no delay, a rate of outbound data may have to be same as a rate of inbound data, in the P/S system 600. That is, the publisher 601 in the P/S system 600 may have to publish the subscriptions at least at a rate at which the new information is received from the producer 603.

A lead subscription group includes latest subscriptions from the database. The lead subscription group is transmitted at least at a rate at which the inbound data is received at the database 602 from the producer 603. The lead subscription group may not be slowed down. If a subscriber is slow in consuming a subscription in the lead subscription group, the subscription is moved to another subscription group trailing the lead subscription group.

Dynamically Routing Subscriptions from a Publisher to a Subscriber

Figure 7:
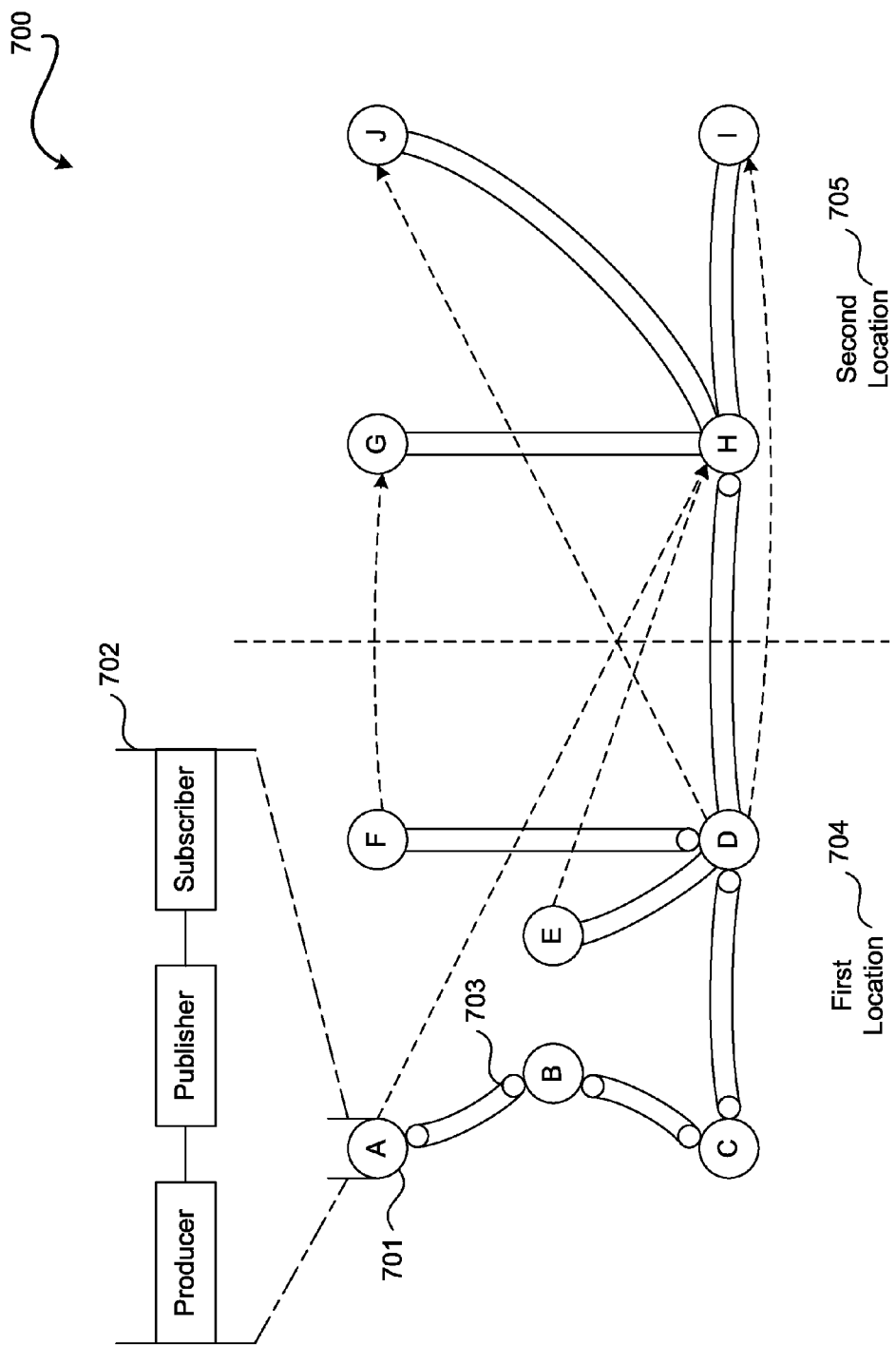
FIG. 7 is a block diagram illustrating dynamic routing of subscriptions from a publisher to a subscriber in the publish-subscribe system.

FIG. 7 is a block diagram illustrating dynamic routing of subscriptions from a publisher to a subscriber in a P/S system 700, according to an embodiment of the invention. Consider a scenario where a publisher such as, for example, node A 701 in first location 704 may have to publish a subscription to a subscriber node H in second location 705. The publisher, node A may have to make a network connection from node A in the first location 704 to node H in the second location 705 to transmit the subscription. Similarly, publisher node D may have to make network connections to subscriber nodes I and J in the second location 705, publisher node E to subscriber node H, and publisher node F to subscriber node G (all network connections indicated by dashed lines). A number of network connections are made from the first location 704 to the second location 705. If the first location 704 and second location 705 are in, for example, different countries, making a number of cross country network connections may consume significant amount of time, resources, cost etc. Further, delays may be introduced in the P/S system if the network connections are slow. In order to avoid the above mentioned disadvantages, the P/S system 700 may dynamically generate a route from a source publisher to a destination subscriber via intermediary nodes such that the efficiency of the system, at least in terms of amount of time consumed, resources used, or cost incurred, may be improved.

The P/S system 700 may generate a route using any or all of the nodes, namely, nodes A-J as intermediary nodes. Each of the nodes may act as a producer, a publisher, a consumer, or any combination of these three types of entities. For example, node A 701 may act as a producer, a publisher, a consumer combination 702. Nodes A-F are in the first location 704 and nodes G-J are in the second location 705. The first location 704 and the second location 705 may include, but is not limited to, different buildings, different cities, different countries, or different continents. In an embodiment, nodes A-F may be in a same location.

Each of the intermediary nodes may act as a producer, a publisher and a subscriber. The intermediary node consumes the subscription transmitted by a previous node, produces the consumed subscription as a new subscription and publishes the new subscription to a next node. That is, each of the intermediary nodes may act as a proxy publisher-subscriber for transmitting the subscriptions from the source publisher to the destination subscriber. Each of the nodes can run on or more computers in a computer system. In P/S system 700, new routes are generated dynamically using which nodes A-F in the first location 704 can publish subscriptions to nodes G-J in the second location 705. For example, node A can publish the subscriptions to node H using the route A->B->C->D->H. Similarly, node D can publish the subscriptions to nodes J and I using the routes D->H->J and D->H->I, respectively, node E can publish the subscriptions to node H using the route E->D->H, and node F can publish the subscriptions to node G using the route F->D->H->G.

As can be seen, the number of network connections from the first location 704 to the second location 705 is minimized to a single network connection from node D to node H. All the subscriptions from any of the publishers in the first location 704 to the any of the subscribers in the second location 705 are routed through the single network connection. Further, chaining the nodes in the above manner may also help in avoiding a situation where a same subscription is sent to the second location 705 over more than one network connection between the nodes in the first location 704 and the second location 705. For example, consider a scenario where nodes J and I have subscribed to same subscriptions from node D. The above generated route enables transmitting the subscription to nodes J and I using a single network connection between node D in the first location 704 and node H in the second location 705. The subscription may then be transmitted to each of the nodes I and H from node H.

A P/S system 700 may use a message queue such as, for example, message queue 703 to transmit the subscriptions between nodes. A message queue which uses a queue for messaging (which typically includes passing of control information or of data) may be used for inter-process communications. Message queues may be generated along the route from the source publisher to the destination subscriber to transmit the subscriptions. A message placed onto the queue may be stored until the recipient (node) retrieves the message. The subscriber receives the subscriptions in an order transmitted by the publisher.

Figure 8:
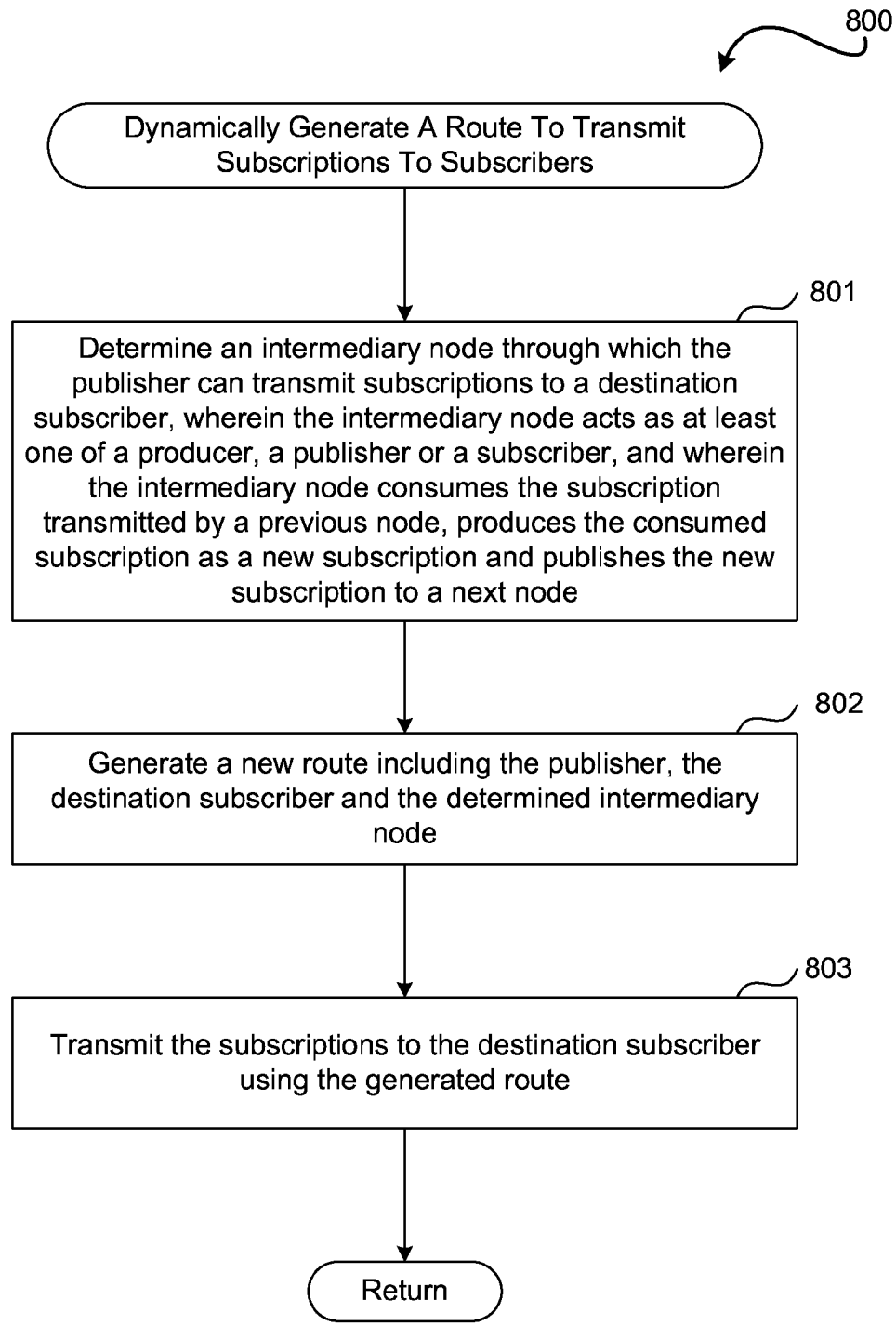
FIG. 8 is a flow diagram illustrating a method for dynamically generating a route from a publisher to a subscriber to transmit a subscription.

FIG. 8 is a flow diagram illustrating a method 800 for dynamically generating a route from a publisher to a subscriber to transmit a subscription from the publisher to the subscriber, according to an embodiment of the invention. The method 800 may be used in a P/S system such as, for example, P/S system 700 of FIG. 7. At step 801, a publisher determines an intermediary node through which the publisher can transmit subscriptions to a subscriber. The intermediary node acts as at least one of a producer, a publisher or a subscriber. Further, the intermediary node may perform at least one of: (i) consuming the subscription transmitted by a previous node, (ii) producing the subscription consumed as a new subscription, or (iii) publishing the new subscription to a next node.

At step 802, the publisher generates a route including the publisher, the subscriber and the determined intermediary node. At step 803, the publisher transmits the subscriptions to the subscriber using the generated route.

Checkpoints in Subscriptions

For every subscription transmitted by a publisher, such as, for example, publisher 204 of FIG. 2, a subscriber such as, for example, first subscriber 201 may receive a token, also referred as a checkpoint. By responding to such token, the first subscriber 201 may inform the publisher 204 that the first subscriber 201 has consumed all the subscriptions prior to this token successfully. The subscriber may acknowledge a token either: (i) immediately after consuming a subscription the token is associated with, (ii) after consuming a configurable number of subscriptions, or (iii) after consuming subscriptions for a configurable period of time. Acknowledging a token after consuming a configurable number of subscriptions or after consuming subscriptions for a configurable period of time indicates that the subscriber has consumed a number of subscriptions, or subscriptions for the configurable period of time successfully. Transmitting a single acknowledgement for a plurality of subscriptions saves, at least, time and network bandwidth consumed as compared to sending an acknowledgement for every single subscription consumed. If the publisher 204 does not receive an acknowledgement for a token in accordance with any of the above mentioned three criteria, the publisher 204 may resend the subscriptions from a point immediately after the last token for which the publisher 204 received the acknowledgment.

Further, in an embodiment, transmitting the subscriptions to the subscribers and receiving the acknowledgements for the transmitted subscriptions can be performed synchronously or asynchronously. Transmitting the subscriptions and receiving the acknowledgements for the transmitted asynchronously, enables the publisher 204 to transmit a subsequent subscription to the subscriber without having to wait for the subscriber to acknowledge a previously transmitted subscription. Accordingly, a delay caused due to waiting to receive an acknowledgement for every subscription transmitted, before a subsequent subscription could be transmitted, is minimized.

The token may indicate at least one of: (i) a position of the subscription in a stream of subscriptions transmitted to the first subscriber 201, or (ii) a time when the subscription was published by the publisher 204. The token may be added to the subscription by the publisher 204.

Subscribing to a Logical Partition of a Database in a Publish-Subscribe System

As described above with respect to FIG. 2, a database 206 in a P/S system 200 may, contain subscriptions which include information generated by a producer 205. The database 206 may be considered to be made up of a number of logical partitions, wherein each of the logical partitions contains a subset of the subscriptions in the database. Further, the logical partitions contain non-overlapping subsets of subscriptions in the database. For example, database 206 may have data pertaining to Z users which are stored in different shards. For example, a first shard 207, a second shard 208, and a third shard 209 may have data pertaining to A, B, C users respectively, where $A \subset Z$, $B \subset Z$, and $C \subset Z$ and $\{A \cap B\} = \emptyset$, $\{B \cap C\} = \emptyset$, and $\{C \cap A\} = \emptyset$, and where the symbol $\subset$ denotes a subset of, $\cap$ intersection and $\emptyset$ denotes a null set. That is, each of the logical partitions may have data that is different from each other. In order to ensure that all subscriptions from the database 206 are being subscribed to, the P/S system 200 has to ensure that each of the logical partitions, namely, a first shard 207, a second shard 208, and a third shard 209 has a subscriber who is subscribed to the subscriptions from the logical partition.

Figure 9:
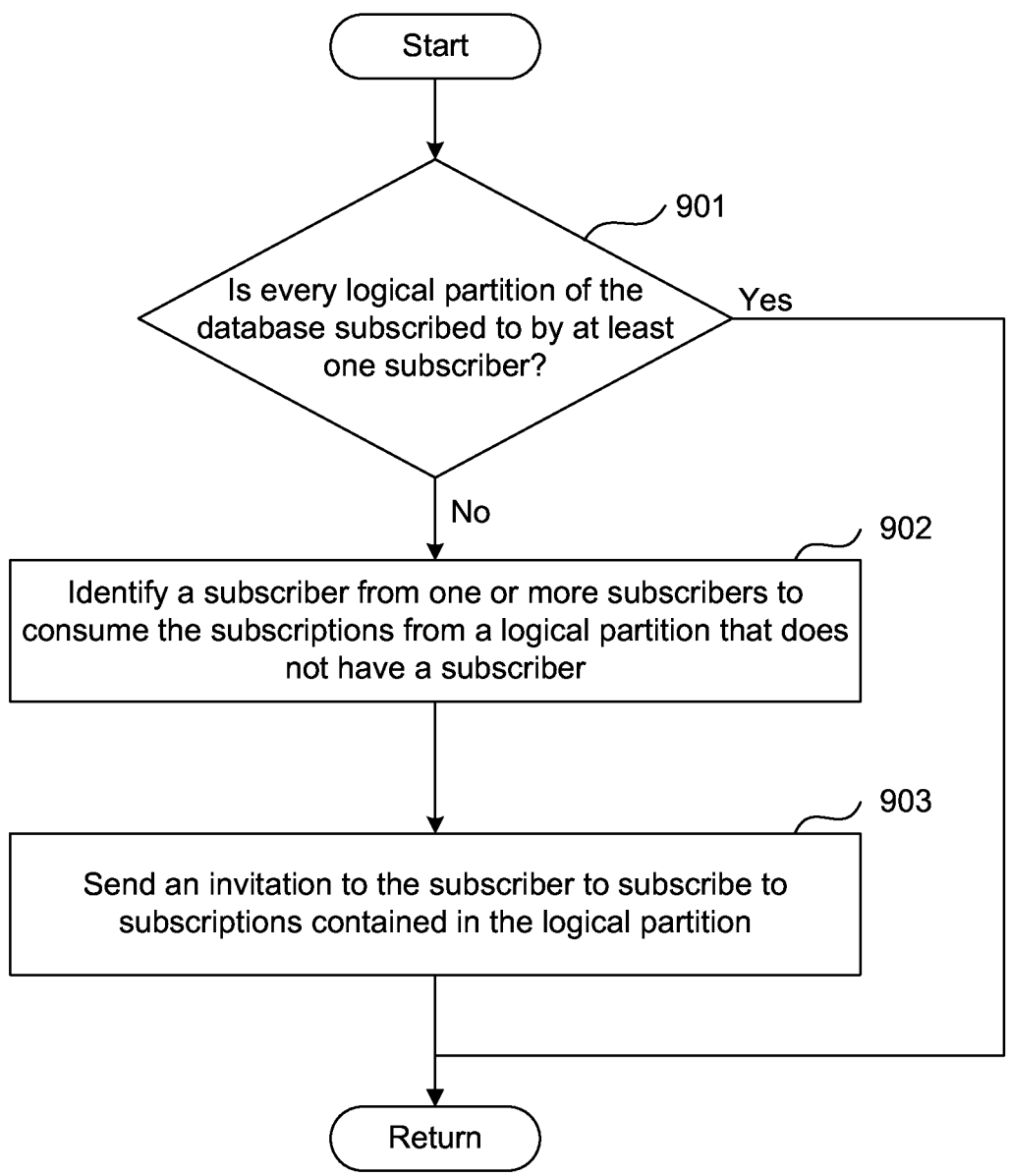
FIG. 9 is a flow diagram illustrating a method for inviting a subscriber to subscribe to a logical partition of a storage system.

FIG. 9 is a flow diagram illustrating a method 900 to invite a subscriber to subscribe to a logical partition of a storage system, according to an embodiment of the invention. At determination step 901, the publisher determines whether each of the logical partitions of the storage system such as, for example, a database is subscribed to by at least one of the subscribers. Responsive to a determination that a logical partition among the logical partitions of the database is not subscribed to by the at least one of the subscribers, at step 902, the publisher identifies a subscriber from the subscribers as a potential consumer of a set of subscriptions contained in the logical partition. On the other hand, responsive to a determination that all the logical partitions of the database are subscribed to by at least one subscriber, the method 900 returns. At step 903, the publisher sends an invitation to the subscriber to subscribe to the set of subscriptions contained in the logical partition.

Referring back to step 902, in an embodiment, a subscriber may be identified as a potential consumer of a set of subscriptions based, at least in part, on a random function.

Multiplexing Multiple Subscriptions

In a P/S system with many publishers and many subscribers, there may often exist multiple subscriptions between a given publisher and a subscriber. Such subscriptions between a given publisher and a subscriber are typically transmitted over multiple network connections, such as transfer control protocol (TCP)/Internet protocol (IP) connections. The number of network connections between a given publisher and a subscriber may be minimized by multiplexing the subscriptions over a single network connection.

Figure 10:
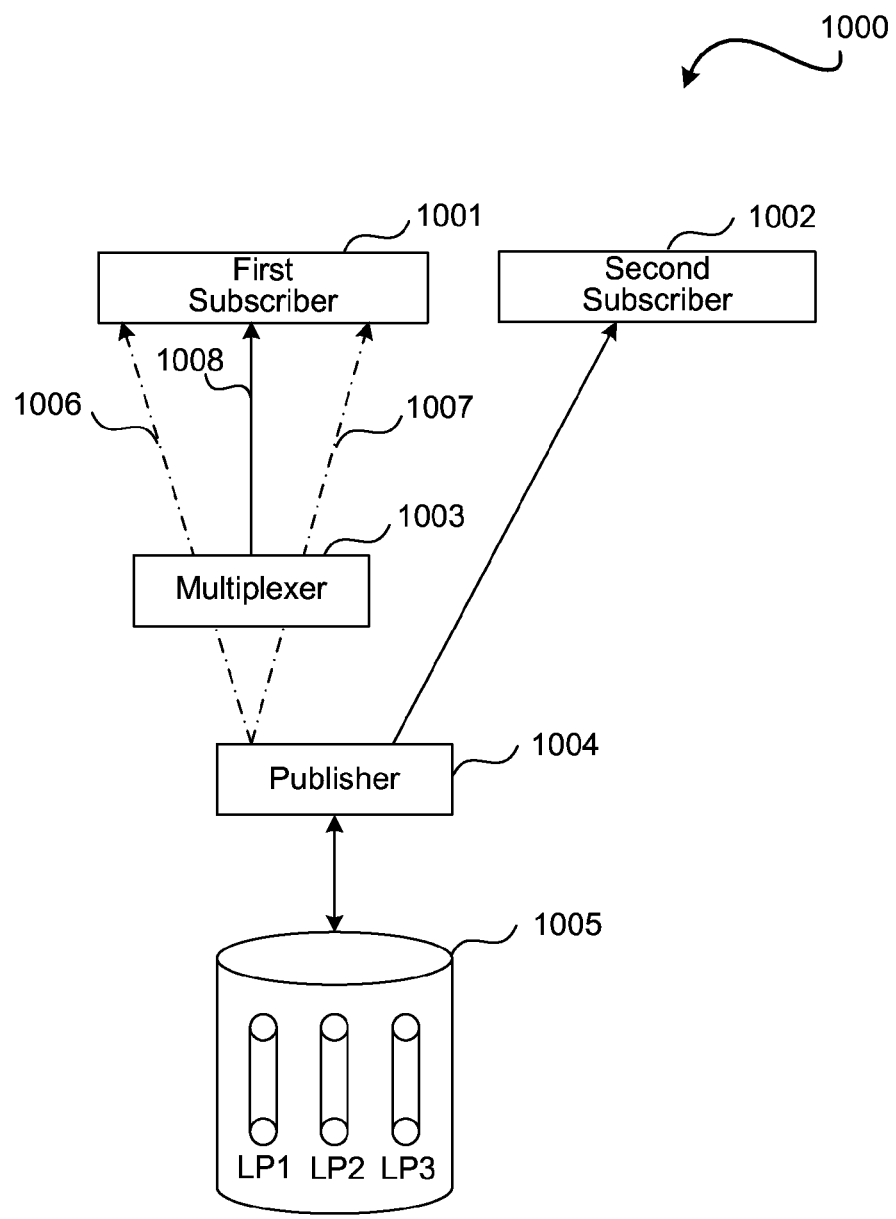
FIG. 10 is a block diagram illustrating a multiplexer for multiplexing subscriptions between a publisher-subscriber pair.

FIG. 10 is a block diagram illustrating a multiplexer for multiplexing subscriptions between a publisher-subscriber pair, according to an embodiment of the invention. A P/S system 1000 includes a first subscriber 1001 and a second subscriber 1002 receiving subscriptions from a publisher 1004. The P/S system 1000 also includes a storage system such as, for example, database 1005 storing subscriptions in logical partitions, namely, LP1, LP2 and LP3. The first subscriber 1001 may have subscribed to two sets of subscriptions, for example, one from the logical partition LP1 and another from the logical partition LP2. A second subscriber 1002 may have subscribed to one or more of the logical partitions LP1, LP2 or LP3.

Separate network connections may be created, between a given publisher and a subscriber, for transmitting subscriptions from each logical partition a subscriber is subscribed to. Accordingly, for the first subscriber 1001, two separate network connections are created between the first subscriber 1001 and the publisher 1004. A first network connection 1006 is created for transmitting subscriptions from logical partition LP1 and a second network connection 1007 is created for transmitting subscriptions from logical partition LP2. A multiplexer 1003 enables transmitting both sets of the subscriptions to the first subscriber 1001 over a single network connection such as 1008 by multiplexing the subscriptions from both the logical partitions LP1 and LP2 over the network connection 1008.

The multiplexer 1003 can be integrated into the publisher 1004, or can run on one or more different machines. Further, the network connection may include, but is not limited to, TCP/IP. The P/S system 1000 may be similar to the P/S system 200 of FIG. 2, but may include the multiplexer 1004 additionally.

Figure 11:
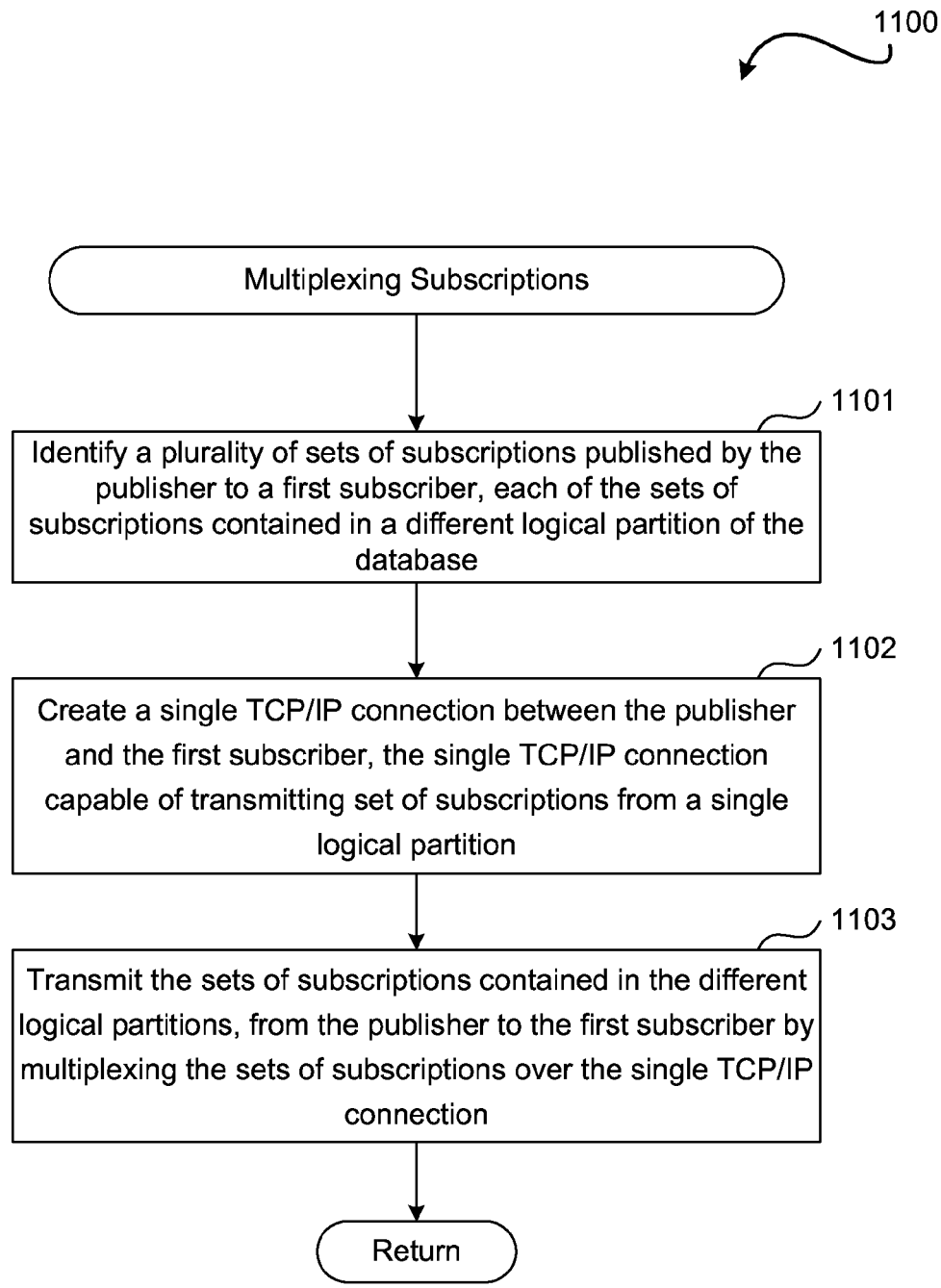
FIG. 11 is a flow diagram illustrating a method for multiplexing multiple subscriptions between a publisher and a subscriber.

FIG. 11 is a flow diagram illustrating a method 1100 for multiplexing multiple subscriptions between a publisher and a subscriber, according to an embodiment of the invention. The method 1100 may be used in P/S system such as, for example, P/S system 1000 of FIG. 10. At step 1101, a multiplexer identifies a plurality of subscriptions published by a publisher of a P/S system to a first subscriber in the P/S system. Each of the subscriptions may be contained in different logical partitions of a storage system in the P/S system. At step 1102, the multiplexer creates a single network connection that is capable of transmitting subscriptions from a single logical partition, between the publisher and the first subscriber. At step 1103, the publisher transmits the subscriptions to the first subscriber by multiplexing the subscriptions that are fetched from different logical partitions, over the single network connection between the publisher and the first subscriber.

Auto-Identification of Deprecated Logical Partitions

A logical partition of a storage system may become inactive or non-functional or deprecated for various reasons, such as data in the storage system being migrated from one machine to another machine, a part of the data in storage system being non-accessible, data being moved from one logical partition to another, data being moved from one part of a storage system to another part of the storage system on the same machine, the logical partition being made unavailable to a particular publisher, or the logical partition being moved off of a particular publisher. When a logical partition becomes inactive, a P/S system may have to determine whether the logical storage has failed permanently and whether the data has moved from one logical partition to another logical partition. If the publisher determines that it no longer needs to consider a logical partition (such as would happen if the partition moved), the publisher takes actions to reclaim resources that may have been allocated for that partition. The following paragraphs, in association with FIGS. 12 and 13, describe how a publisher makes that determination.

Figure 12:
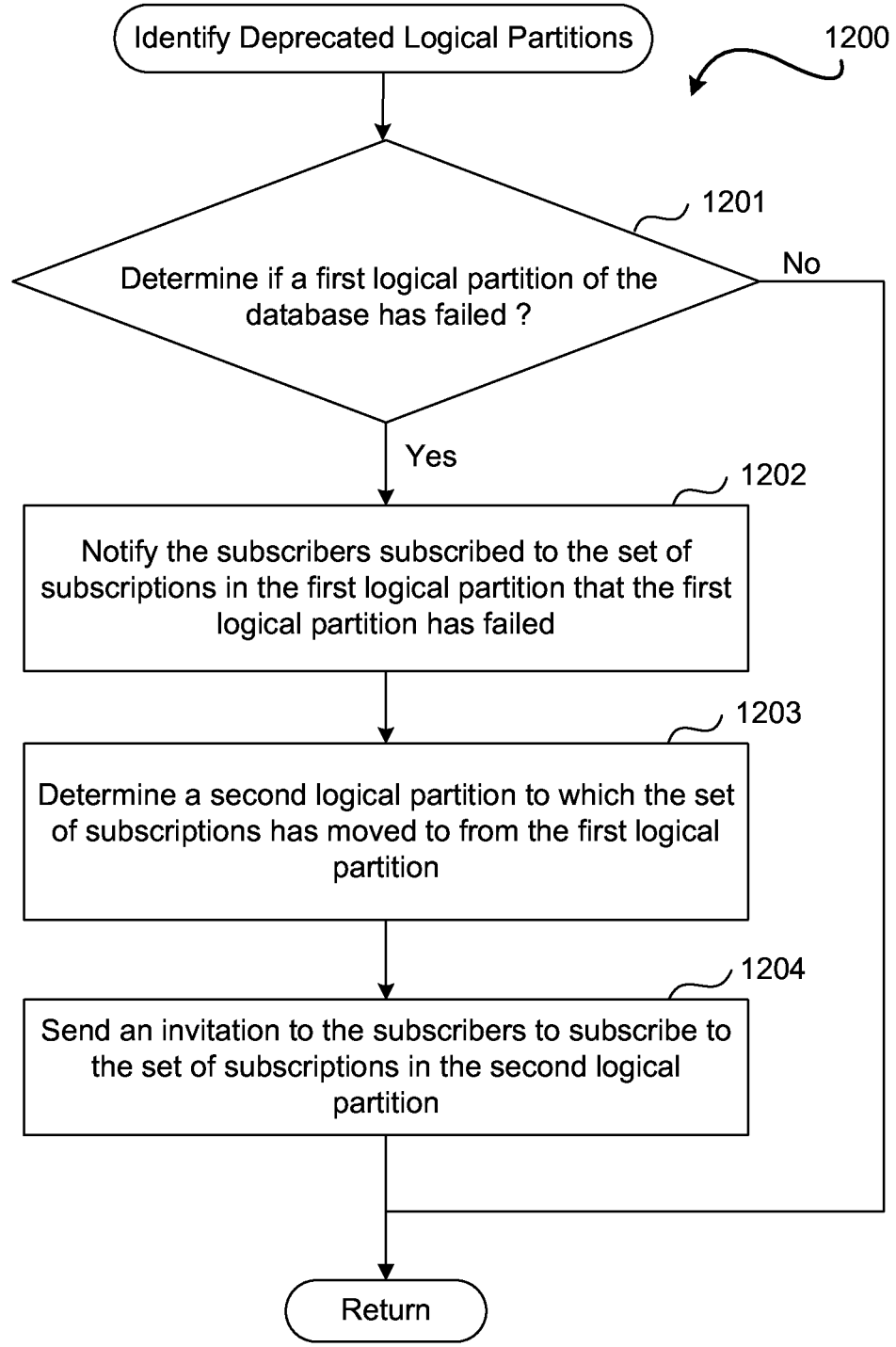
FIG. 12 is a flow diagram illustrating a method for sending an invitation to subscribers to subscribe to a new logical partition in case of a failure of an existing logical partition, according to an embodiment on the invention.

FIG. 12 is a flow diagram illustrating a method 1200 for sending an invitation to subscribers to subscribe to a new logical partition in case of a failure of an existing logical partition, according to an embodiment on the invention. At determination step 1201, the publisher determines whether a logical partition of a storage system such as, for example, a database in a P/S system has failed permanently. Responsive to a determination that the logical partition has not failed, the method 1200 returns. On the other hand, responsive to a determination that the logical partition has failed permanently, at step 1202, the publisher notifies the subscribers subscribed to the set of subscriptions in the logical partition that the first logical partition has failed. At step 1203, the publisher determines a new logical partition to which the set of subscriptions has moved to from the logical partition. In an embodiment of the invention, the first logical partition and the second logical partition may or may not be in a same database. At step 1204, the publisher sends an invitation to the subscribers to subscribe to the set of subscriptions in the new logical partition.

Figure 13:
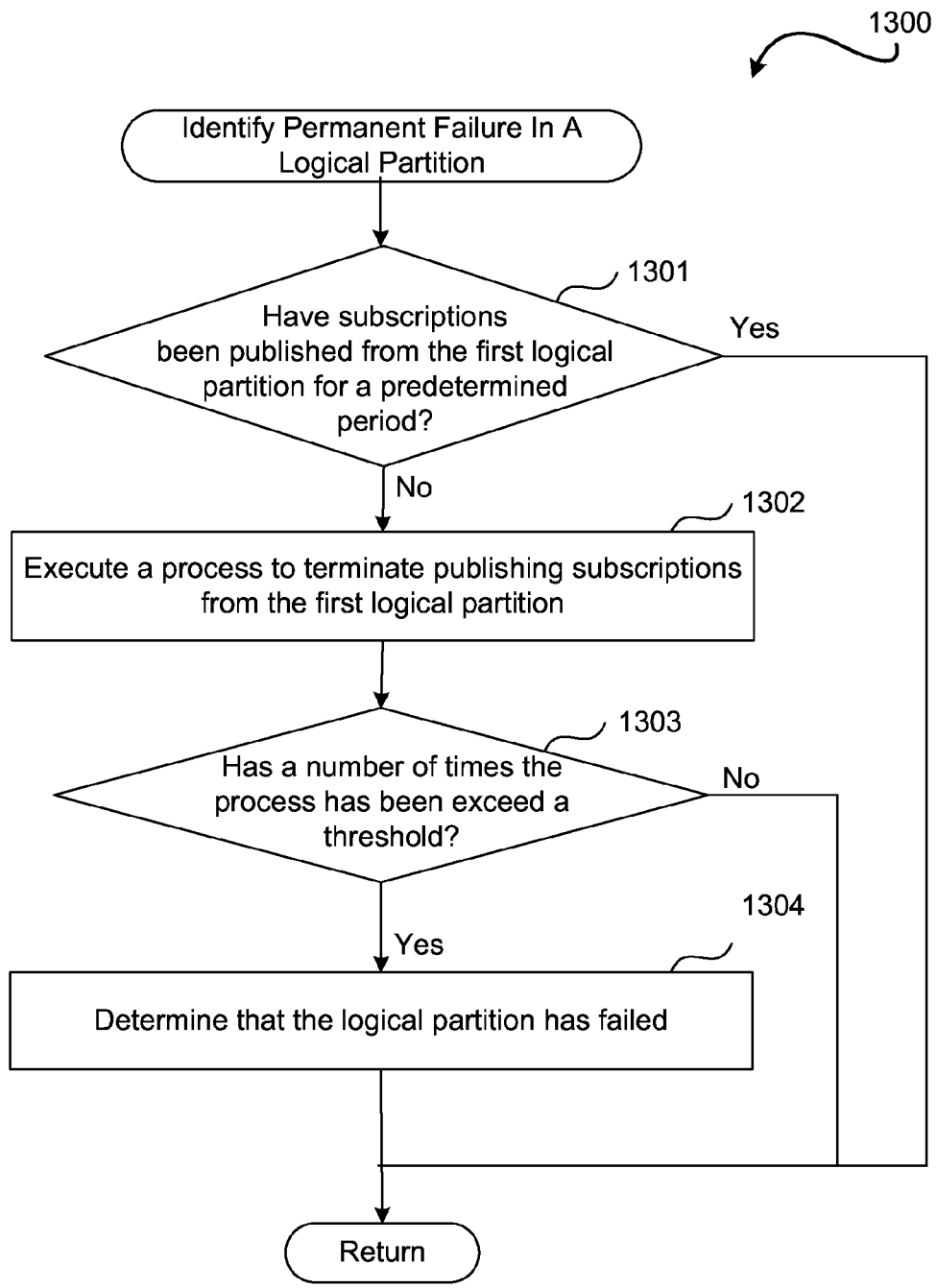
FIG. 13 is a flow diagram illustrating a method for determining if a logical partition has permanently failed.

FIG. 13 is a flow diagram illustrating a method 1300 to determine if a logical partition has permanently failed, according to an embodiment of the invention. At determination step 1301, the publisher determines whether no subscriptions have been published from a logical partition for a predetermined period. Responsive to a determination that subscriptions have been published from the logical partition in the predetermined period, the method 1300 returns. On the other hand, responsive to a determination that no subscriptions have been published from the logical partition for the predetermined period, at step 1302, the publisher executes a process to indicate that a logical partition is inactive. In an embodiment, the process may include a garbage collection process that terminates publishing of subscriptions from the logical partition. At determination step 1303, the publisher determines whether a number of times that the process is executed exceeds a predefined threshold. Responsive to a determination that a number of times the process is executed does not exceed a predefined threshold, the method 1300 returns. On the other hand, responsive to a determination that a number of times the process is executed exceeds a predefined threshold, at step 1304, the publisher determines that the logical partition has failed permanently. In another embodiment, a P/S system may determine that the logical partition has failed permanently if the logical unit is inactive for a certain period of time. A publisher of the P/S system may include other processes that are capable of distinguishing between when a logical partition is temporarily inactive or permanently inactive. Further, at least some of the acts described above as being performed by the publisher, may instead be performed by various other modules or entities in the P/S system in cooperation with the publisher.

Exemplary Apparatus for Implementation

Figure 14:
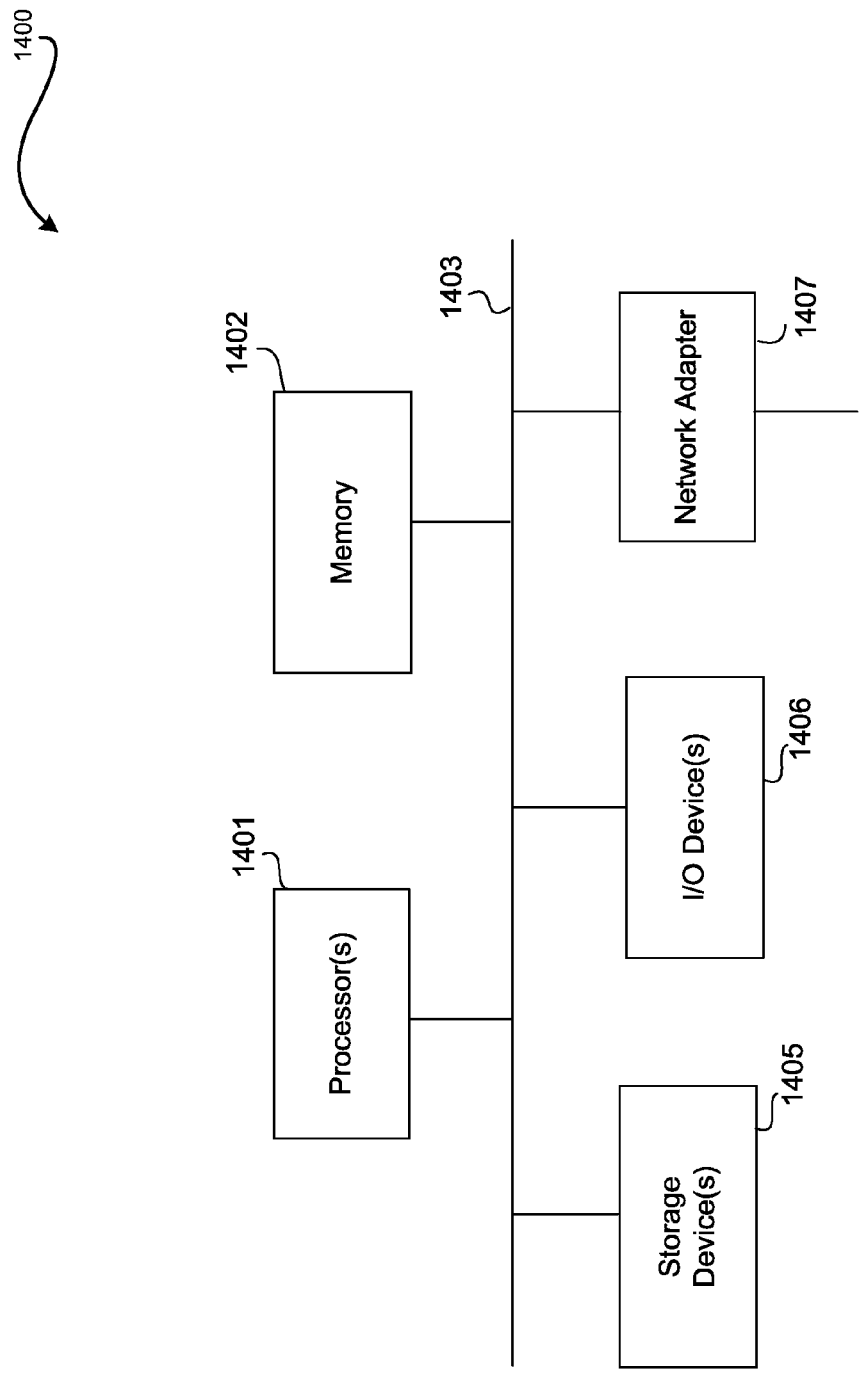
FIG. 14 is a block diagram of an apparatus that may perform various operations, and store various information generated and/or used by such operations.

FIG. 14 is a block diagram of an apparatus that may perform various operations, and store various information generated and/or used by such operations, according to an embodiment of the invention. The apparatus may represent any computer described herein. The computer 1400 is intended to illustrate a hardware device on which any of the entities, components or services depicted in the examples of FIGS. 1-13 (and any other components described in this specification) can be implemented such as publishers, subscribers, producers, databases etc. The computer 1400 includes one or more processors 1401 and memory 1402 coupled to an interconnect 1403. The interconnect 1403 is shown in FIG. 14 as an abstraction that represents any one or more separate physical buses, point to point connections, or both connected by appropriate bridges, adapters, or controllers. The interconnect 1403, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1401 is/are the central processing unit (CPU) of the computer 1400 and, thus, control the overall operation of the computer 1400. In certain embodiments, the processor(s) 1401 accomplish this by executing software or firmware stored in memory 1402. The processor(s) 1401 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1402 is or includes the main memory of the computer 1400. The memory 1402 represents any form of random access memory (RAM), read-only memory (ROM), flash memory, or the like, or a combination of such devices. In use, the memory 1402 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1401 through the interconnect 1403 are a network adapter 1407, a storage device(s) 1405 and I/O device(s) 1406. The network adapter 1407 provides the computer 1400 with the ability to communicate with remote devices, over a network and may be, for example, an Ethernet adapter or Fibre Channel adapter. The network adapter 1407 may also provide the computer 1400 with the ability to communicate with other computers within the cluster. In some embodiments, the computer 1400 may use more than one network adapter to deal with the communications within and outside of the cluster separately.

The I/O device(s) 1406 can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

The code stored in memory 1402 may be implemented as software and/or firmware to program the processor(s) 1401 to carry out actions described above. In certain embodiments, such software or firmware may be initially provided to the computer 1400 by downloading it from a remote system through the computer 1400 (e.g., via network adapter 1407).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine may also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 1405 includes, for example, recordable/non-recordable media (e.g., read-only memory (ROM); random access memory (RAM); magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A computer-implemented method, comprising:
  receiving, at a computer system, a request for transmitting multiple subscriptions to multiple subscribers, wherein the multiple subscribers include a first subscriber that subscribes to a specified subscription of the multiple subscriptions, the first subscriber subscribing to the specified subscription by subscribing to a specified logical partition of multiple logical partitions of a data storage system at which the specified subscription is stored, each of the multiple logical partitions including a separate non-overlapping subset of the multiple subscriptions;

identifying, at the computer system, multiple sets of subscriptions published by a publisher to the first subscriber, the multiple sets of subscriptions stored in different logical partitions;

receiving, at a multiplexer of the computer system and from the publisher, the multiple sets of subscriptions from the different logical partitions;

creating, at the computer system, a single transfer control protocol (TCP)/Internet protocol (IP) connection between the multiplexer and the first subscriber, the single TCP/IP connection capable of transmitting subscriptions from any of the multiple logical partitions; and transmitting, from the multiplexer to the first subscriber, the multiple sets of subscriptions by multiplexing the multiple sets of subscriptions over the single TCP/IP connection.

2. The computer-implemented method of claim 1, wherein transmitting the multiple sets of subscriptions further includes:

categorizing, by the computer system, the multiple subscribers to multiple subscription groups, wherein each of the multiple subscription groups includes a set of the multiple subscribers whose consumption characteristics satisfy a specified criterion for the corresponding group; and transmitting, by the computer system, the subscriptions to the multiple subscribers in accordance with the multiple subscription groups.

3. The computer-implemented method of claim 2, wherein the consumption characteristic includes a consumption rate of a subscriber of the multiple subscribers, wherein the specified criterion includes a specified range of the consumption rate, and wherein different subscription groups has different specified ranges.

4. The computer-implemented method of claim 3, wherein the specified ranges are determined as a function of consumption rates of the multiple subscribers.

5. The computer-implemented method of claim 3, wherein the specified ranges are determined as a function of a lowest consumption rate of any of the multiple subscribers and a highest consumption rate of any of the multiple subscribers.

6. The computer-implemented method of claim 3, wherein the specified ranges are determined as a function of a number of the multiple subscribers.

7. The computer-implemented method of claim 3, wherein the specified ranges are determined as a function of a number of the multiple subscriptions.

8. The computer-implemented method of claim 3, wherein one of the subscription groups is a lead subscription group which includes subscriptions of those subscribers whose consumption rates fall within a highest specified range among the specified ranges.

9. The computer-implemented method of claim 8, wherein transmitting the multiple subscriptions to the multiple subscribers includes transmitting the multiple subscriptions as a stream of the subscription groups in which subscriptions from the lead subscription group is transmitted ahead of subscriptions of the remaining subscription groups.

10. The computer-implemented method of claim 8 further comprising:

receiving, at the computer system, information from a producer that is to be published as a set of subscriptions to the multiple subscribers at a first rate; and transmitting, by the computer system, the set of subscriptions to the multiple subscribers at least at the first rate.

11. The computer-implemented method of claim 10, wherein transmitting the set of subscriptions to the multiple subscribers at the first rate includes configuring the lead subscription group to include those subscribers whose consumption rates are not below the first rate.

12. The computer-implemented method of claim 3 further comprising:

confirming that a consumption rate of a subscriber of the multiple subscribers has changed from a first specified range of the specified ranges to a second specified range of the specified ranges; and moving a subscription of the subscriber, from a first subscription group having subscriptions of those of the multiple subscribers whose consumption rates correspond to the first specified range, to a second subscription group having subscriptions of those of the multiple subscribers whose consumption rates correspond to the second specified range, in a stream of subscription groups.

13. The computer-implemented method of claim 12, wherein moving the subscription of the subscriber includes:

determining one of the multiple subscription groups that trails the first subscription group in the stream as the second subscription group in an event the consumption rate of the subscriber has decreased; and determining one of the multiple subscription groups that is ahead of the first subscription group in the stream as the second subscription group in an event the consumption rate of the subscriber has increased.

14. The computer-implemented method of claim 1 further comprising:

confirming that at least one of the multiple logical partitions of the data storage system is not subscribed to by any of the multiple subscribers;

identifying a subscriber from the multiple subscribers as a potential consumer of a set of subscriptions contained in the at least one of the multiple logical partitions; and sending an invitation to the subscriber to subscribe to the set of subscriptions.

15. The computer-implemented method of claim 1 further comprising:

confirming, by the computer system, that a set of the multiple subscriptions has moved from a first logical partition of the multiple logical partitions to a second logical partition of the multiple logical partitions; and notifying, by the computer system, subscribers subscribed to the set of the multiple subscriptions that the set of the multiple subscriptions has moved to the second logical partition.

16. The computer-implemented method of claim 1 further comprising:

confirming, by the computer system, that a first logical partition of the logical partitions of the data storage system has failed;

notifying, by the computer system, a set of the multiple subscribers subscribed to a set of the multiple subscriptions stored in the first logical partition that the first logical partition has failed; and sending an invitation to the set of the multiple subscribers to subscribe to a second logical partition of the multiple logical partitions to which the set of the multiple subscriptions are moved.

17. The computer-implemented method of claim 16, wherein confirming that the first logical partition has failed includes:
- confirming that no subscriptions have been published from the first logical partition for a predetermined period; and
- confirming that a process to terminate publishing the set of the multiple subscriptions from the first logical partition responsive is executed more than a predefined number of times.

18. A computer-readable storage device storing computer-readable instructions, comprising:
- instructions for receiving, at a computer system, a request for transmitting multiple subscriptions to multiple subscribers, wherein the multiple subscribers include a first subscriber that subscribes to a specified subscription of the multiple subscriptions, the first subscriber subscribing to the specified subscription by subscribing to a specified logical partition of multiple logical partitions of a data storage system at which the specified subscription is stored, each of the multiple logical partitions including a separate non-overlapping subset of the multiple subscriptions;
- instructions for identifying, at the computer system, multiple sets of subscriptions published by a publisher to the first subscriber, the multiple sets of subscriptions stored in different logical partitions;
- instructions for receiving, at a multiplexer of the computer system and from the publisher, the multiple sets of subscriptions from the different logical partitions;
- instructions for creating, at the computer system, a single transfer control protocol (TCP)/Internet protocol (IP) connection between the multiplexer and the first subscriber, the single TCP/IP connection capable of transmitting subscriptions from any of the multiple logical partitions; and
- instructions for transmitting, from the multiplexer to the first subscriber, the multiple sets of subscriptions by multiplexing the multiple sets of subscriptions over the single TCP/IP connection.

19. The computer-readable storage device of claim 18, where the instructions for transmitting includes:
- instructions for categorizing the multiple subscribers to multiple subscription groups, wherein each of the multiple subscription groups includes a set of the multiple subscribers whose consumption characteristics satisfy a specified criterion for the corresponding group; and
- instructions for transmitting the multiple subscriptions to the multiple subscribers in accordance with the multiple subscription groups.

20. An apparatus comprising:
a processor; and
a storage device storing processor executable instructions which, when executed by the processor, cause the processor to execute a process including:
- receiving a request for transmitting multiple subscriptions to multiple subscribers, wherein the multiple subscribers include a first subscriber that subscribes to a specified subscription of the multiple subscriptions, the first subscriber subscribing to the specified subscription by subscribing to a specified logical partition of multiple logical partitions of a data storage system at which the specified subscription is stored, each of the multiple logical partitions including a separate non-overlapping subset of the multiple subscriptions;
- identifying multiple sets of subscriptions published by a publisher to the first subscriber, the multiple sets of subscriptions stored in different logical partitions;
- receiving, from the publisher, the multiple sets of subscriptions from the different logical partitions;
- creating a single transfer control protocol (TCP)/Internet protocol (IP) connection between the multiplexer and the first subscriber, the single TCP/IP connection capable of transmitting subscriptions from any of the multiple logical partitions; and
- transmitting, to the first subscriber, the multiple sets of subscriptions by multiplexing the multiple sets of subscriptions over the single TCP/IP connection.

\* \* \* \* \*